(12) United States Patent
Takeuchi

(10) Patent No.: US 11,874,162 B2
(45) Date of Patent: Jan. 16, 2024

(54) ELECTROMAGNETIC WAVE DETECTION APPARATUS AND INFORMATION ACQUISITION SYSTEM

(71) Applicant: KYOCERA Corporation, Kyoto (JP)

(72) Inventor: Eri Takeuchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 706 days.

(21) Appl. No.: 17/052,686

(22) PCT Filed: May 8, 2019

(86) PCT No.: PCT/JP2019/018387
§ 371 (c)(1),
(2) Date: Nov. 3, 2020

(87) PCT Pub. No.: WO2019/220978
PCT Pub. Date: Nov. 21, 2019

(65) Prior Publication Data
US 2021/0181013 A1    Jun. 17, 2021

(30) Foreign Application Priority Data

May 15, 2018 (JP) ................................. 2018-094103

(51) Int. Cl.
*G01J 1/04* (2006.01)
*G01J 5/48* (2022.01)
*G02B 26/10* (2006.01)

(52) U.S. Cl.
CPC .......... *G01J 1/0477* (2013.01); *G01J 1/0403* (2013.01); *G01J 1/044* (2013.01); *G01J 1/0414* (2013.01); *G01J 5/48* (2013.01); *G02B 26/108* (2013.01)

(58) Field of Classification Search
None
See application file for complete search history.

(56) References Cited

U.S. PATENT DOCUMENTS

| | | | |
|---|---|---|---|
| 4,851,696 A | * | 7/1989 | West ........................ G01J 1/06 250/559.16 |
| 6,567,366 B2 | | 5/2003 | Kim et al. |

(Continued)

FOREIGN PATENT DOCUMENTS

| CN | 1210333 A | 3/1999 |
|---|---|---|
| CN | 1713022 A | 12/2005 |

(Continued)

*Primary Examiner* — Michael P Stafira
(74) *Attorney, Agent, or Firm* — Studebaker & Brackett PC

(57) ABSTRACT

An electromagnetic wave detection apparatus 10 includes a first propagation unit 16, a second propagation unit 17, a first detector 19, and a second detector 20. The first propagation unit 16 propagates electromagnetic waves incident on a reference surface ss in a particular direction using each pixel px. The second propagation unit 17 includes a first surface s1, a second surface s2, a third surface s3, a fourth surface s4, a fifth surface s5, and a sixth surface s6. The first surface s1 propagates electromagnetic waves incident from a first direction in a second direction and propagates electromagnetic propagated in a third direction in a fourth direction. The second surface s2 separates electromagnetic waves propagated in the second direction d2 and propagate electromagnetic waves in a third direction d3 and a fifth direction d5. The first detector 19 detects electromagnetic waves emitted from the third surface s3. The second detector 20 detects electromagnetic waves emitted from the sixth surface s6.

15 Claims, 15 Drawing Sheets

(56) References Cited

U.S. PATENT DOCUMENTS

| | | | |
|---|---|---|---|
| 6,573,505 B2* | 6/2003 | Richman | G01J 3/0262 |
| | | | 250/353 |
| 7,224,384 B1 | 5/2007 | Iddan et al. | |
| 2003/0132405 A1 | 7/2003 | Some | |
| 2004/0141742 A1* | 7/2004 | So | G06E 3/00 |
| | | | 398/45 |
| 2005/0077470 A1 | 4/2005 | Tichit et al. | |
| 2006/0001837 A1 | 1/2006 | Ho | |
| 2006/0098283 A1 | 5/2006 | Sato | |
| 2012/0038789 A1 | 2/2012 | Kelly et al. | |
| 2014/0267881 A1* | 9/2014 | Bernal | G02B 27/1013 |
| | | | 348/360 |
| 2015/0029503 A1 | 1/2015 | McMackin | |
| 2015/0378023 A1 | 12/2015 | Royo Royo et al. | |
| 2016/0249810 A1* | 9/2016 | Darty | H04N 23/74 |
| | | | 600/477 |
| 2017/0176338 A1* | 6/2017 | Wu | G02B 21/367 |
| 2019/0162976 A1* | 5/2019 | Sondermann | G02B 27/1026 |

FOREIGN PATENT DOCUMENTS

| | | | | |
|---|---|---|---|---|
| EP | 2 957 926 A1 | | 12/2015 | |
| JP | 3507865 B2 | | 3/2004 | |
| JP | 2007-183444 A | | 7/2007 | |
| JP | 201022723 A | | 6/2010 | |
| JP | 2013-150146 A | | 8/2013 | |
| JP | 2015111184 A | * | 6/2015 | ......... G02B 17/0856 |
| JP | 2018-023077 A | | 2/2018 | |
| JP | 2019015789 A | * | 1/2019 | ......... G02B 26/0833 |
| WO | 2012/021450 A1 | | 2/2012 | |

* cited by examiner

ELECTROMAGNETIC WAVE DETECTION APPARATUS AND INFORMATION ACQUISITION SYSTEM

CROSS REFERENCE TO RELATED APPLICATION

This application claims priority to and the benefit of Japanese Patent Application No. 2018-94103 filed on May 15, 2018, the entire contents of which are incorporated herein by reference.

TECHNICAL FIELD

The present disclosure relates to an electromagnetic wave detection apparatus and an information acquisition system.

BACKGROUND

Devices such as a DMD (Digital Micromirror Device) that include an element for changing a propagation direction of electromagnetic waves incident on each pixel are known. For example, an apparatus that forms a primary image of an object on a surface of a DMD and then forms a secondary image of the primary image formed on the surface of the DMD on a surface of a CCD (Charge-Coupled Device) via a lens is known (see PTL 1 set forth below).

CITATION LIST

Patent Literature

PTL 1: Japanese Patent No. 3507865

SUMMARY

An electromagnetic wave detection apparatus according to a first aspect includes:

a first propagation unit comprising a plurality of pixels along a reference surface and configured to propagate electromagnetic waves incident on the reference surface in a particular direction at each of the pixels;

a second propagation unit including a first surface configured to propagate electromagnetic waves incident from a first direction in a second direction and propagate electromagnetic waves propagated in a third direction in a fourth direction, a second surface configured to separate electromagnetic waves propagated in the second direction and propagate the electromagnetic waves in the third direction and a fifth direction, a third surface configured to emit electromagnetic waves propagated in the fourth direction, a fourth surface configured to emit electromagnetic waves propagated in the fifth direction towards the reference surface and to propagate electromagnetic waves incident again from the reference surface in a sixth direction, a fifth surface configured to propagate electromagnetic waves propagated in the sixth direction in a seventh direction, and a sixth surface configured to emit electromagnetic waves propagated in the seventh direction;

a first detector configured to detect electromagnetic waves emitted from the third surface; and a second detector configured to detect electromagnetic waves emitted from the sixth surface.

An information acquisition system according to a second aspect includes:

an electromagnetic wave detection apparatus that includes a first propagation unit comprising a plurality of pixels along a reference surface and configured to propagate electromagnetic waves incident on the reference surface in a particular direction at each of the pixels, a second propagation unit including a first surface configured to propagate electromagnetic waves incident from a first direction in a second direction and propagate electromagnetic waves propagated in a third direction in a fourth direction, a second surface configured to separate electromagnetic waves propagated in the second direction and propagate the electromagnetic waves in the third direction and a fifth direction, a third surface configured to emit electromagnetic waves propagated in the fourth direction, a fourth surface configured to emit electromagnetic waves propagated in the fifth direction towards the reference surface and to propagate electromagnetic waves incident again from the reference surface in a sixth direction, a fifth surface configured to propagate electromagnetic waves propagated in the sixth direction in a seventh direction, and a sixth surface configured to emit electromagnetic waves propagated in the seventh direction, a first detector configured to detect electromagnetic waves emitted from the third surface, and a second detector configured to detect electromagnetic waves emitted from the sixth surface; and a controller configured to acquire information regarding the surroundings of the electromagnetic wave detection apparatus, based on electromagnetic waves detected by the first detector and the second detector.

DETAILED DESCRIPTION

Hereinafter, an embodiment of an electromagnetic wave detection apparatus to which the present disclosure is applied will be described with reference to the drawings. An electromagnetic wave detection apparatus that includes a primary imaging optical system for forming an image of incident electromagnetic waves and a separation surface for separating electromagnetic waves having passed through the primary imaging optical system can separately detect each of the separated electromagnetic waves. Because in such an electromagnetic wave detection apparatus the separation surface needs to be disposed on an image side of the primary imaging optical system, it is necessary to lengthen a back focus of the primary imaging optical system. However, lengthening the back focus may deteriorate imaging characteristics such as imaging performance, brightness, and an angle of view, due to design restrictions of the primary imaging optical system. Thus, it is desired to reduce the length of the back focus. In order to reduce the length of the back focus, it is conceivable to approximate an angle between a main axis of the primary imaging optical system and the separation surface to 90°. However, if the angle approximates 90°, interference may occur between a detector configured to detect electromagnetic waves reflected by the separation surface and the primary imaging optical system, whereby actual manufacturing can become complicated. Accordingly, the electromagnetic wave detection apparatus to which the present disclosure is applied includes a surface that propagates electromagnetic waves having transmitted through the primary imaging optical system towards the separation surface and, further, propagates electromagnetic waves propagating from the separation by the separation surface towards the detector, whereby the length of back focus can be reduced. By reducing the length of the back focus, image forming characteristics such as imaging performance, brightness, and an angle of view of the primary imaging optical system can be secured.

Figure 1:
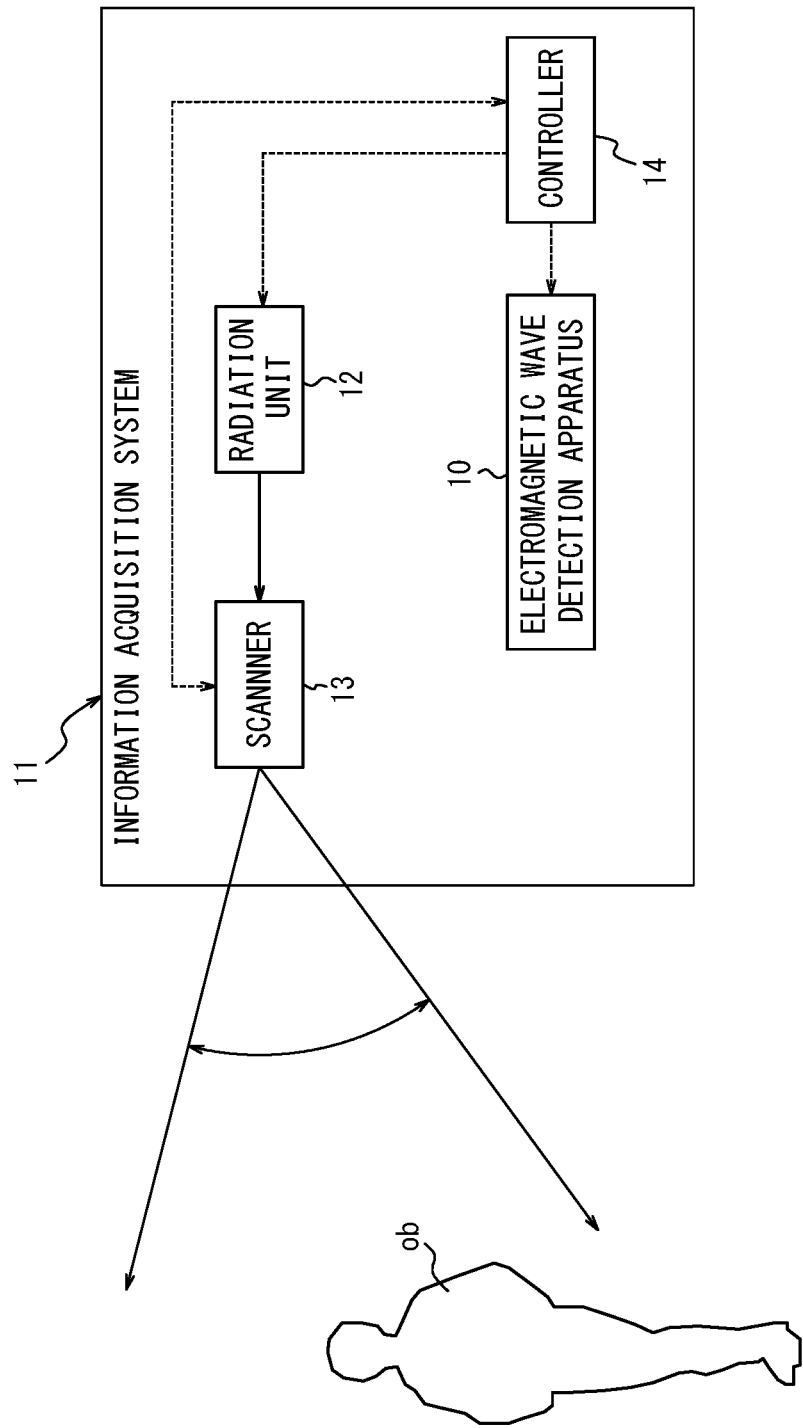
FIG. 1 is a diagram illustrating a schematic configuration of an information acquisition system that includes an electromagnetic wave detection apparatus according to a first embodiment.

An information acquisition system 11 that includes an electromagnetic wave detection apparatus 10 according to a first embodiment of the present disclosure includes the electromagnetic wave detection apparatus 10, a radiation unit 12, a scanner 13, and a controller 14, as illustrated in FIG. 1.

In subsequent drawings, a broken line connecting functional blocks indicates a flow of a control signal or communicated information. Communication represented by a broken line may be wired communication or wireless communication. A solid line projecting from each functional block indicates a beam of electromagnetic waves.

Figure 2:
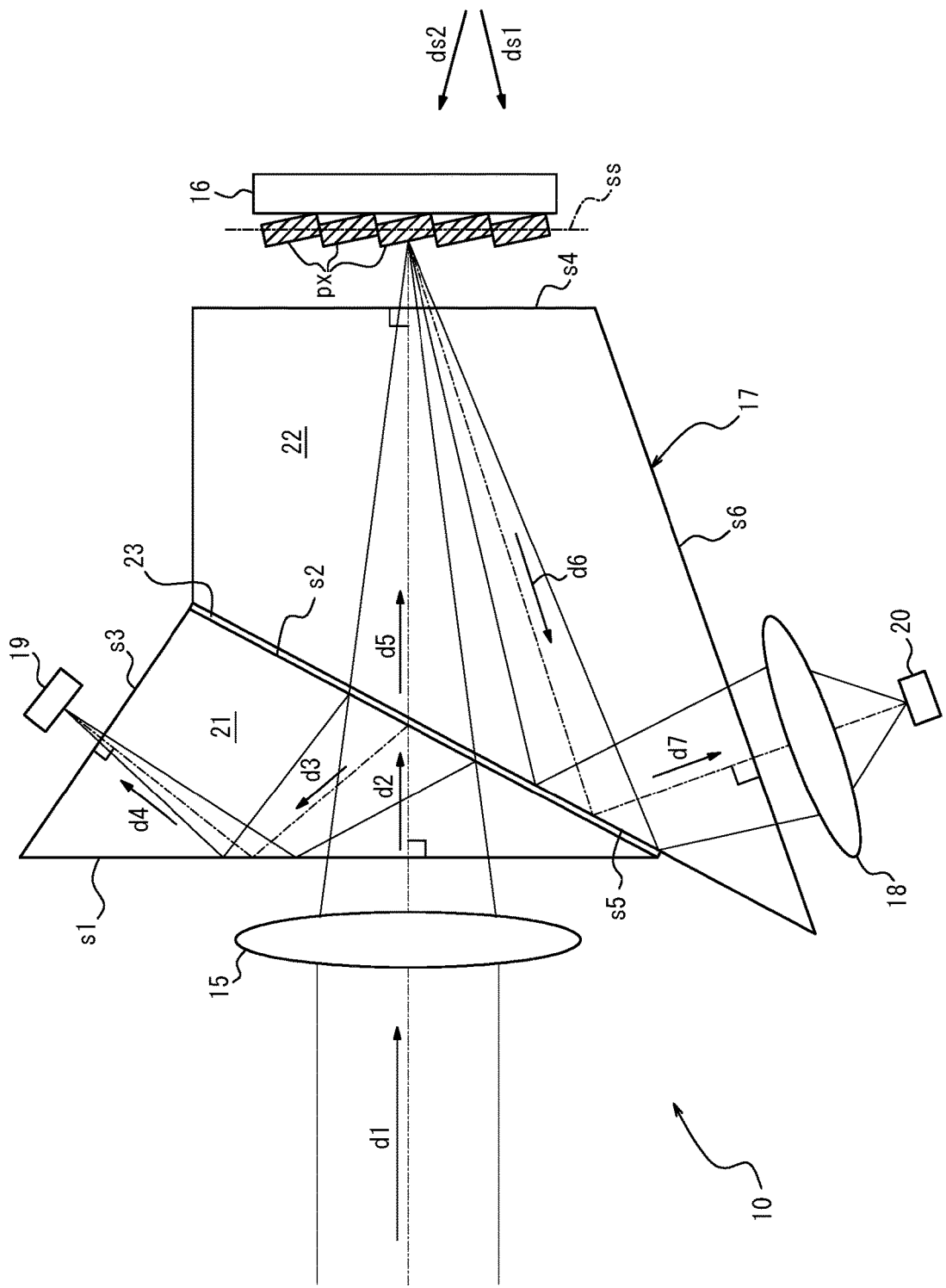
FIG. 2 is a diagram illustrating a schematic configuration of the electromagnetic wave detection apparatus illustrated in FIG. 1.

The electromagnetic wave detection apparatus 10 includes a first imaging unit 15, a first propagation unit 16, a second propagation unit 17, a second imaging unit 18, a first detector 19, and a second detector 20, as illustrated in FIG. 2.

The first imaging unit 15 includes, for example, at least one of a lens and a mirror. The first imaging unit 15 propagates an image of electromagnetic waves of an object ob serving as a subject incident from a first direction d1 with respect to the electromagnetic wave detection apparatus 10 towards a first surface s1 of the second propagation unit 17. The first imaging unit 15 forms an image of electromagnetic waves of an object ob at a position remote from the first surface s1. The first direction d1 includes, for example, a direction that is parallel to a principal axis of the first imaging unit 15 and directed to the first imaging unit 15 from an object plane and to an image plane from the first imaging unit 15.

The first propagation unit 16 is provided in a path of electromagnetic waves that have been incident on the first surface s1 of the second propagation unit 17 and emitted from a fourth surface s4. Further, the first propagation unit 16 may be provided at or in the vicinity of a primary imaging position of the object ob located remote from the first imaging unit 15 by a predetermined distance.

In the first embodiment, the first propagation unit 16 is provided at the primary image formation position. The first propagation unit 16 may have a reference surface ss on which electromagnetic waves is to be incident after having passed through the first imaging unit 15 and the second propagation unit 17. The reference surface ss is made up of a plurality of pixels px aligned in two dimensions. The reference surface ss is a surface that causes an action such as, for example, reflection and transmission of electromagnetic waves in at least one of a first state and a second state, which will be described below. The first propagation unit 16 may form an image of electromagnetic waves of the object ob formed by the first imaging unit 15 on the reference surface ss. The reference surface ss may be perpendicular to a propagation axis of electromagnetic waves emitted from a fourth surface s4.

The first propagation unit 16 propagates electromagnetic waves incident on the reference surface ss in a particular direction. The first propagation unit 16 can switch each of the pixels px between a first state of propagating electromagnetic waves in a first direction d1 as the particular direction and a second state of propagating electromagnetic waves in a second direction d2 as another particular direction. According to the first embodiment, the first state includes a first reflection state in which electromagnetic waves incident on the reference surface ss are reflected in the first direction d1. The second state includes a second reflection state in which electromagnetic waves incident on the reference surface ss are reflected in the second direction d2.

In the first embodiment, the first propagation unit 16 may more specifically include a reflection surface that reflects an electromagnetic wave for each pixel px. The first propagation unit 16 may switch the first reflection state and the second reflection state for each pixel px by changing an orientation of the reflection surface for each pixel px.

According to the first embodiment, the first propagation unit 16 may include, for example, a DMD (Digital Micromirror Device). The DMD can drive minute reflection surfaces constituting the reference surface ss such that the reflection surface for each of the pixels px is inclined at +12° or −12° with respect to the reference surface ss. The reference surface ss may be parallel to a plate surface of the substrate including the minute reflection surfaces of the DMD mounted thereon.

The first propagation unit 16 switches each of the pixels px between the first state and the second state, based on control by the controller 14, as will be described below. For example, the first propagation unit 16 can propagate electromagnetic waves incident on a portion of pixels px in the first selection direction ds1 by simultaneously switching the pixels px to the first state and propagate electromagnetic waves incident on another portion of pixels px in the second selection direction ds2 by switching the pixels px to the second state.

The second propagation unit 17 is provided between the first imaging unit 15 and the first propagation unit 16. The second propagation unit 17 separates electromagnetic waves propagated from the first imaging unit 15 and emits electromagnetic waves to the first detector 19 and the first propagation unit 16. The second propagation unit 17 emits electromagnetic waves whose propagation direction is changed by the first propagation unit 16 to the second detector 20. A detailed configuration of the second propagation unit 17 will be described below.

The second propagation unit 17 includes at least a first surface s1, a second surface s2, a third surface s3, a fourth surface s4, a fifth surface s5, and a sixth surface s6.

The first surface s1 propagates electromagnetic waves incident on the second propagation unit 17 from the first direction d1 in the second direction d2. The first surface s1 may be perpendicular to a propagation axis of electromagnetic waves that are incident on the first surface s1 from the first direction d1. Because the first direction d1 is parallel to the principal axis of the first imaging unit 15 as described above, the principal axis of the first imaging unit 15 and the first surface s1 may be vertical to each other, in other words, a principal plane of the first imaging unit 15 and the first surface s1 may be parallel to each other. The first surface s1 may propagate electromagnetic waves incident from the first direction d1 in the second direction d2 by transmitting or refracting the electromagnetic waves.

The first surface s1 propagates electromagnetic waves propagated in a third direction d3 from the second surface s2 in a fourth direction d4, as will be described below. The first surface s1 may subject the electromagnetic waves propagated in the third direction d3 from the second surface s2 to internal reflection and propagate the electromagnetic waves in the fourth direction d4. The first surface s1 may subject the electromagnetic waves propagated in the third direction d3 from the second surface s2 to total internal reflection and propagate the electromagnetic waves in the fourth direction d4. An incident angle of electromagnetic waves propagated in the third direction d3 from the second surface s2 with respect to the first surface s1 may be equal to or larger than a critical angle.

The second surface s2 separates electromagnetic waves propagated in the second direction d2 from the first surface s1 and propagates the electromagnetic waves in the third direction d3 and the fifth direction d5. Among the electromagnetic waves propagated in the second direction d2, the second surface s2 may propagate electromagnetic waves having a particular wavelength in the third direction d3 and propagate electromagnetic waves having other wavelengths in the fifth direction d5. Among the electromagnetic waves propagated in the second direction d2, the second surface s2 may reflect the electromagnetic waves having the particular wavelength in the third direction d3, and may transmit or refract the electromagnetic waves having other wavelengths in the fifth direction d5. Among the electromagnetic waves propagated in the second direction, the second surface s2 may subject the electromagnetic waves having the particular wavelength to total reflection and propagate in the third direction d3, and may transmit or refract the electromagnetic waves having other wavelengths in the fifth direction d5. An incident angle of the electromagnetic waves propagated in the second direction d2 with respect to the second surface s2 may be smaller than the critical angle.

The third surface s3 emits electromagnetic waves propagating from the first surface s1 in the fourth direction d4 from the second propagation unit 17. The third surface s3 may be perpendicular to a propagation axis of the electromagnetic waves propagating from the first surface s1 in the fourth direction d4, that is, perpendicular to the fourth direction d4.

The fourth surface s4 emits electromagnetic waves propagated in the fifth direction d5 from the second surface s2 to the reference surface ss of the first propagation unit 16. Further, the fourth surface s4 propagates electromagnetic waves incident again from the reference surface ss of the first propagation unit 16 in a sixth direction d6. The fourth surface s4 may be perpendicular to a propagation axis of electromagnetic waves propagated in the fifth direction d5 from the second surface s2, that is, perpendicular to the fifth direction d5. The fourth surface s4 may be parallel to the reference surface ss of the first propagation unit 16. The fourth surface s4 may transmit or refract electromagnetic waves incident again from the reference surface ss in the sixth direction d6.

The fifth surface s5 propagates electromagnetic waves propagated in the sixth direction d6 from the fourth surface s4 in a seventh direction d7. The fifth surface s5 may subject the electromagnetic waves propagated in the sixth direction d6 from the fourth surface s4 to internal reflection and propagate the electromagnetic waves in the seventh direction. The fifth surface s5 may subject the electromagnetic waves propagated in the sixth direction d6 from the fourth surface s4 to total internal reflection and propagate the electromagnetic waves in the seventh direction. An incident angle of the electromagnetic waves propagated in the sixth direction d6 from the fourth surface s4 with respect to the fifth surface s5 may be equal to or greater than the critical angle. The incident angle of the electromagnetic waves propagated in the sixth direction d6 from the fourth surface s4 with respect to the fifth surface s5 may be different from the incident angle of the electromagnetic waves propagated in the second direction from the first surface s1 with respect to the second surface s2. The incident angle of the electromagnetic waves propagated in the sixth direction d6 from the fourth surface s4 with respect to the fifth surface s5 may be larger than the incident angle of the electromagnetic waves propagated in the second direction from the first surface s1 with respect to the second surface s2. The fifth surface s5 may be parallel to the second surface s2.

The sixth surface s6 emits electromagnetic waves propagated in the seventh direction d7 from the fifth surface s5. The sixth surface s6 may be perpendicular to a propagation axis of the electromagnetic waves propagated in the seventh direction d7 from the fifth surface s5, that is, perpendicular to the seventh direction d7.

Hereinafter, the first surface s1 to the sixth surface s6 in the first embodiment will be described with a detail description of a configuration of the second propagation unit 17.

In the first embodiment, the second propagation unit 17 includes a first prism 21, a second prism 22, and a first intermediate layer 23.

The first prism 21 may include the first surface s1, the second surface s2, and the third surface s3 as different surfaces. The first prism 21 may include, for example, a triangular prism in which the first surface s1, the second surface s2, and the third surface s3 intersect with one another.

The first prism 21 may be arranged such that the propagation axis of electromagnetic waves incident on the first surface s1 from the first direction d1 is perpendicular to the first surface s1. The first prism 21 may be arranged such that the second surface s2 is located in the second direction d2 of propagation through the first prism 21 after transmission or refraction at the first surface s1 from the first direction d1. The first prism 21 may be arranged such that the first surface s1 is located in the third direction d3 in which electromagnetic waves reflected at the second surface s2 propagate. Further, the first prism 21 may be arranged such that the third surface s3 is located in the fourth direction d4 in which electromagnetic waves having propagated in the third direction from the second surface s2 and reflected by the first surface s1 propagate.

The second prism 22 may include at least the fourth surface s4, the fifth surface s5, and the sixth surface s6 as different surfaces. The second prism 22 may include, for example, a rectangular prism in which the fourth surface s4, the fifth surface s5, and the sixth surface s6 intersect with one another.

The second prism 22 may be arranged such that the fifth surface s5 is parallel to and opposes the second surface s2 of the first prism 21. The second prism 22 may be arranged such that the fourth surface s4 is located in a propagation direction of electromagnetic waves propagating through the second prism 22 via the fifth surface s5 after being transmitted from the second surface s2 of the first prism 21. The second prism 22 may be arranged such that the sixth surface s6 is located in the second direction d7, which is a reflection angle equal to an incident angle of electromagnetic waves incident from the sixth direction d6 with respect to the fifth surface s5.

The first intermediate layer 23 may be arranged between the first prism 21 and the second prism 22. Further, the first intermediate layer 23 may be in contact with the second surface s2 of the first prism 21 and may include the second surface s2 along the boundary surface with the first prism 21. The first intermediate layer 23 may be in contact with the fifth surface s5 of the second prism 22 and may include the fifth surface s5 along the boundary surface with the second prism 22. The first intermediate layer 23 includes, for example, a visible light reflective coating, a half mirror, a beam splitter, a dichroic mirror, a cold mirror, a hot mirror, a meta surface, or a deflection element, which is attached to the second surface s2.

A refractive index of the first intermediate layer 23 may be smaller than a refractive index of the second prism 22. Thus, electromagnetic waves that propagate through the second prism 22 and is incident at an incident angle equal to or larger than the critical angle is totally internally reflected by the fifth surface s5. Accordingly, the fifth surface s5 internally reflects electromagnetic waves that propagate having a propagation axis in the fifth direction d5 within the second prism 22. In a configuration in which the incident angle of electromagnetic waves from the sixth direction d6 is equal to or larger than the critical angle, the fifth surface s5 subjects electromagnetic waves internally propagated in the sixth direction d6 to total reflection and propagate the electromagnetic waves in the seventh direction d7.

The second imaging unit 18 may be provided on a path of electromagnetic waves that propagate in the seventh direction d7 from the second propagation unit 17 and exit from the sixth surface s6. Further, the second imaging unit 18 may be provided such that the principal plane thereof is parallel to the sixth surface s6.

The second imaging unit 18 includes, for example, at least one of a lens and a mirror. The second imaging unit 18 may form a primary image on the reference surface ss of the first propagation unit 16 and propagate an image of the object ob as electromagnetic waves emitted from the sixth surface s6 via the second propagation unit 17 towards the second detector 20 for image formation.

The first detector 19 detects electromagnetic waves emitted from the third surface s3. In order to detect electromagnetic waves emitted from the third surface s3, the first detector 19 may be provided on the path of electromagnetic waves that propagate in the fourth direction d4 from the second propagation unit 17. Further, the first detector 19 may be provided at or in the vicinity of the image forming position of the object ob by the first imaging unit 15 in the fourth direction d4 from the second propagation unit 17.

Thus, an image of electromagnetic waves of the object ob that reaches a detection surface of the first detector 19 via the second surface s2, the first surface s1, and the third surface s3 may be formed. Also, a difference between a length of propagation path of electromagnetic waves propagated in the third direction d3 from the second surface s2 to the first detector 19 and a length of a propagation path of electromagnetic waves propagated in the fifth direction d5 from the second surface s2 to the reference surface ss may be equal to or smaller than a predetermined value, or these lengths of the propagation paths may be equal to each other.

The first detector 19 may be disposed such that the detection surface is parallel to the third surface s3. As described above, the third surface s3 may be perpendicular to the propagation axis of electromagnetic waves propagated in the fourth direction d4 to be emitted. The detection surface of the first detector 19 may be perpendicular to the propagation axis of electromagnetic waves emitted from the third surface s3.

In the first embodiment, the first detector 19 includes a passive sensor. In the first embodiment, the first detector 19 includes, in particular, an element array. For example, the first detector 19 may include an image sensor or an imaging array, capture an image of electromagnetic waves formed on the detection surface, and generate image information corresponding to the captured object ob.

In the first embodiment, the first detector 19 may capture, in particular, an image of visible light. The first detector 19 may generate the image information and transmits a signal representing the image information to the controller 14.

Note that the first detector 19 may capture an image of infrared light, ultraviolet, radio waves, or the like rather than an image of visible light. The first detector 19 may include a distance measuring sensor. In this configuration, the electromagnetic wave detection apparatus 10 can acquire distance information in the form of an image using the first detector 19. The first detector 19 may include a distance measuring sensor, a temperature sensor, or the like. In this configuration, the electromagnetic wave detection apparatus 10 can acquire temperature information in the form of an image using the first detector 19.

The second detector 20 detects electromagnetic waves emitted from the sixth surface s6 and passed through the second imaging unit 18. In order to detect electromagnetic waves emitted from the sixth surface s6, the second detector 20 may be disposed in a path of electromagnetic waves that propagate via the second imaging unit 18 after being propagated in the second direction d7 from the second propagation unit 17 and being emitted from the sixth surface s6. The second detector 20 may be disposed at or in the vicinity of the secondary image forming position by the second imaging unit 18 to form an image of electromagnetic waves formed on the reference surface ss of the first propagation unit 16.

The second detector 20 may be disposed such that its detection surface is parallel to the sixth surface s6. As described above, the sixth surface s6 may be perpendicular to the propagation axis of the electromagnetic waves propagated in the sixth direction d6 to be emitted, and the detection surface of the second detector 20 may be perpendicular to a propagation axis of electromagnetic waves emitted from the sixth surface s6. The detection surface of the second detector 20 may be parallel to a principal plane of the second imaging unit 18.

In the first embodiment, the second detector 20 may be an active sensor configured to detect electromagnetic waves reflected from the target ob after being emitted toward the object ob by the radiation unit 12. In the first embodiment, the second detector 20 may detect electromagnetic waves that are reflected from the object ob after being emitted from the radiation unit 12, reflected by the scanner 13, and then propagate to the object ob. As will be described below, the electromagnetic waves emitted from the radiation unit 12 may be at least one of infrared light, visible light, ultraviolet, and radio waves. The second detector 20 is a sensor of a type that is the same as or a different from that of the first detector 19, and detects electromagnetic waves of a different type or the same type.

In the first embodiment, the second detector 20 includes, in particular, an element constituting the distance measuring sensor. For example, the second detector 20 includes an element such as an APD (Avalanche PhotoDiode), a PD (PhotoDiode), an SPAD (Single Photon Avalanche Diode), a millimeter wave sensor, a submillimeter-wave sensor, or a distance image sensor. The second detector 20 may include an element array such as an APD array, a PD array, an MPPC (Multi Photon Pixel Counter), a distance measuring imaging array, or a distance measuring image sensor.

In the first embodiment, the second detector 20 transmits, as a signal, detection information indicating that electromagnetic waves reflected from the subject are detected to the controller 14. The second detector 20 is, in particular, an infrared sensor configured to detect electromagnetic waves in the infrared spectrum.

The second detector 20 composed of one element constituting the distance measuring sensor as described above simply needs to be able to detect electromagnetic waves and does not need to form an image on the detection surface. Thus, the second detector 20 does not necessarily need to be arranged at or in the vicinity of the second image forming location where an image is formed by the second imaging unit 18. That is, in this configuration, provided that electromagnetic waves from all angles of view can be incident on the detection surface of the second detector 20, the second detector 20 may be disposed at any location on the path of electromagnetic waves propagating via the second imaging unit 18 after being emitted from the sixth surface s6 of the second propagation unit 17.

In FIG. 1, the radiation unit 12 may emit at least one of infrared light, visible light, ultraviolet, and radio waves. In the first embodiment, the radiation unit 12 emits infrared light. The radiation unit 12 may irradiate the object ob with electromagnetic waves, directly or indirectly via the scanner 13. In the first embodiment, the radiation unit 12 may irradiate the object ob with electromagnetic waves indirectly via the scanner 13.

In the first embodiment, the radiation unit 12 may emit a narrow beam of electromagnetic waves having a beam spread of, for example, 0.5°. In the first embodiment, the radiation unit 12 can emit electromagnetic waves in pulses. For example, the radiation unit 12 includes, for example, an LED (Light Emitting Diode) or an LD (Laser Diode). The radiation unit 12 may switch between radiating and not radiating electromagnetic waves, based on control by the controller 14, as will be described below.

For example, the scanner 13 may include a reflector to reflect electromagnetic waves and change an irradiation location of electromagnetic waves which irradiate the object ob by reflecting electromagnetic waves emitted from the radiation unit 12 while changing the direction thereof. That is, the scanner 13 may scan the object ob using electromagnetic waves emitted from the radiation unit 12. In the first embodiment, accordingly, the second detector 20 may constitute a scanning type distance measuring sensor, together with the scanner 13. The scanner 13 may scan the object ob in one-dimension or in two-dimensions. In the first embodiment, the scanner 13 scans the object ob in two-dimensions.

The scanner 13 may be configured such that at least a portion of an irradiation region of electromagnetic waves that are emitted from the radiation unit 12 and reflected by the scanner 13 is included in a detection region of electromagnetic waves in the electromagnetic wave detection apparatus 10. Thus, at least some of electromagnetic waves radiated to the object ob via the scanner 13 can be detected by the electromagnetic wave detection apparatus 10.

In the first embodiment, the scanner 13 is configured such that at least a portion of the irradiation region of electromagnetic waves that is emitted from the radiation unit 12 and reflected by the scanner 13 is included in a detection region of the second detector 20. In the first embodiment, thus, at least some of electromagnetic waves radiated to the object ob via the scanner 13 can be detected by the second detector 20.

The scanner 13 includes, for example, a MEMS (Microelectromechanical systems) mirror, a polygon mirror, a galvanometer mirror, or the like. In the first embodiment, the scanner 13 includes the MEMS mirror.

The scanner 13 may change a reflection direction of electromagnetic waves, based on control by the controller 14, which will be described below. The scanner 13 may include an angle sensor such as, for example, an encoder and notify the controller 14 of an angle detected by the angle sensor as direction information used for reflecting electromagnetic waves. In this configuration, the controller 14 can calculate the irradiation location, based on the direction information acquired from the scanner 13. Alternatively, the controller 14 can calculate the irradiation location, based on a driving signal input to cause the scanner 13 to change the reflection direction of electromagnetic waves.

The controller 14 includes one or more processors and a memory. The processor may include a general purpose processor configured to read a specific program and perform a specific function, or a specialized processor dedicated for specific processing. The specialized processor may include an ASIC (Application Specific Integrated Circuit). The processor may include a PLD (Programmable Logic Device). The PLD may include an FPGA (Field-Programmable Gate Array). The controller 14 may include at least one of a SoC (System-on-a-Chip) that includes one or more cooperating processors or a SiP (System in a Package).

The controller 14 may acquire information regarding the surroundings of the electromagnetic wave detection apparatus 10, based on electromagnetic waves respectively detected by the first detector 19 and the second detector 20. The information regarding the surroundings is, for example, image information, distance information, temperature information, or the like. In the first embodiment, the controller 14 acquires electromagnetic waves detected as an image by the first detector 19 serving as the image information, as described above. In the first embodiment, further, the controller 14 acquires the distance information regarding the irradiation location irradiated by the radiation unit 12 using a ToF (Time-of-Flight) method, which will be described below, based on the detection information detected by the second detector 20.

Figure 3:
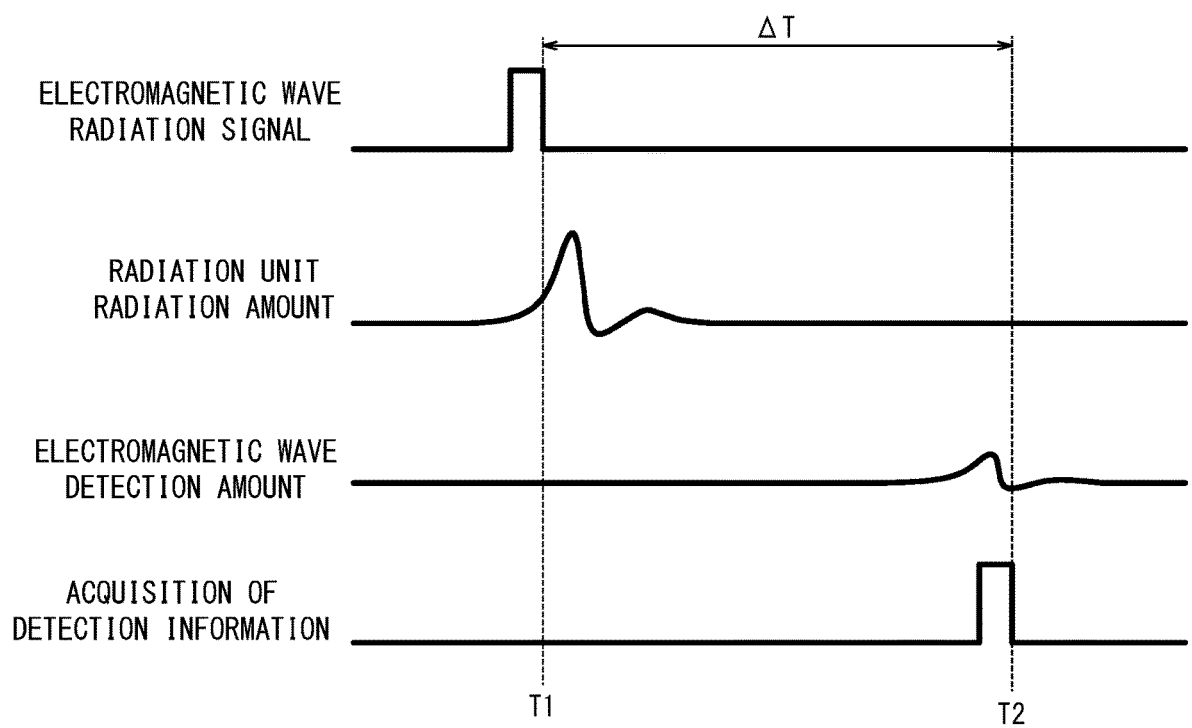
FIG. 3 is a timing chart illustrating radiation timing and detection timing of electromagnetic waves, for explaining the principle of distance measurement performed by a distance measuring sensor made up of a radiation unit, a second detector, and a controller illustrated in FIG. 1.

As illustrated in FIG. 3, the controller 14 causes the radiation unit 12 to emit electromagnetic waves in pulses by inputting an electromagnetic wave radiation signal to the radiation unit 12 (see "ELECTROMAGNETIC WAVE RADIATION SIGNAL" field). The radiation unit 12 emits electromagnetic waves, based on the electromagnetic wave radiation signal (see "RADIATION UNIT RADIATION AMOUNT" field). The electromagnetic waves that have been emitted from the radiation unit 12, reflected by the scanner 13, irradiate any irradiation region are reflected in the irradiation region. The controller 14 changes at least some of the pixels px within an image formation region of the first propagation unit 16 for an image of the reflected wave from the irradiation region formed by the first imaging unit 15 to the first state, and changes other pixels px to the second state. Then, when the second detector 20 detects electromagnetic waves reflected from the irradiation region (see "ELECTROMAGNETIC WAVE DETECTION AMOUNT" field), the second detector 20 notifies the controller 14 of the detection information, as described above.

The controller 14 includes, for example, a time measuring LSI (Large Scale Integrated circuit) and measures a time $\Delta T$ from a time T1 at which the controller 14 causes the radiation unit 12 to emit electromagnetic waves to a time T2 at which the detection information is acquired (see "ACQUISITION OF DETECTION INFORMATION"). The controller 14 calculates a distance to the irradiation location by multiplying the time $\Delta T$ by the speed of light and then dividing an acquired value by 2. The controller 14 calculates the irradiation location, based on the direction information acquired from the scanner 13 or the driving signal input to the scanner 13 by the controller 14, as described above. The controller 14 calculates a distance to an irradiation location while changing the irradiation location, and thus generates the distance information in the form of an image.

In the first embodiment, the information acquisition system 11 is configured to generate the distance information employing a Direct ToF technique that directly measures the time period for radiated electromagnetic waves to return, as described above. However, the information acquisition system 11 is not limited to this configuration. For example, the information acquisition system 11 may be configured to generate the distance information employing a Flash ToF technique that emits electromagnetic waves in a constant cycle and indirectly measures the time period for the electromagnetic waves to return, based on a phase difference between the emitted electromagnetic waves and returned electromagnetic waves. The information acquisition system 11 may generate the distance employing another ToF technique such as, for example, a Phased ToF technique.

The electromagnetic wave detection apparatus 10 of the first embodiment configured as described above includes the second propagation unit 17 and the first detector 19. The second propagation unit 17 includes the first surface s1, the second surface s2, and the third surface s3. The first surface s1 propagates electromagnetic waves incident from the first direction d1 in the second direction d2 and also propagates electromagnetic waves propagated in the third direction d3 in the fourth direction d4. The second surface s2 separates electromagnetic waves propagated in the second direction d2 and propagates electromagnetic waves in the third direction d3 and the fifth direction d5. The third surface s3 emits electromagnetic waves propagated in the fourth direction d4. The first detector 19 is configured to detect electromagnetic waves emitted from the third surface s3. This configuration enables, in the electromagnetic wave detection apparatus 10, arrangement of the first detector 19 in a direction different from the third direction d3 from the second surface s2 that functions as a separation surface. Thus, the electromagnetic wave detection apparatus 10 can avoid the interference between the first imaging unit 15 and the first detector 19 even if the angle formed by the second direction d2 and the second surface s2 approximates 90°. Accordingly, the length of the back focus of the first imaging unit 15 can be reduced. In the electromagnetic wave detection apparatus 10, as a result, a design restriction of the first imaging unit 15 is avoided, and excellent image forming characteristics of the first imaging unit 15 can be secured. Such configuration and effect are applicable also to electromagnetic wave detection apparatuses according to second to eighth embodiments, which will be described below.

In addition, in the electromagnetic wave detection apparatus 10 of the first embodiment, the second propagation unit 17 includes the fourth surface s4 and the fifth surface s5. The fourth surface s4 emits electromagnetic waves propagated in the fifth direction d5 to the reference surface ss and propagates electromagnetic waves incident again from the reference surface ss in the sixth direction d6. The fifth surface s5 propagates electromagnetic waves propagated in the sixth direction d6 in the seventh direction d7. In this configuration, because the electromagnetic wave detection apparatus 10 propagates electromagnetic waves propagated in a particular direction by the reference surface ss further in a different direction, the second imaging unit 18 can be arranged without interfering the first imaging unit 15. In this configuration, further, because in the electromagnetic wave detection apparatus 10 the second imaging unit 18 can be arranged outside the path of the electromagnetic waves from the first imaging unit 15 to the first propagation unit 16, the distance to the reference surface ss from the first imaging unit 15 and the distance of the propagation path of electromagnetic waves to the second imaging unit 18 from the reference surface ss can be reduced. Thus, the electromagnetic wave detection apparatus 10 can cause electromagnetic waves having changed its propagation direction after the formation of the primary image on the reference surface ss to be incident on the second imaging unit 18 before being widely spread while propagating. Accordingly, the electromagnetic wave detection apparatus 10 can reduce the occurrence of vignetting, even when the second imaging unit 18 is downsized. As a result, the electromagnetic wave detection apparatus 10 can homogenize the intensity of electromagnetic waves of a secondarily image formed on the second imaging unit 18, without increasing the size of the apparatus as a whole. Such configuration and effect are applicable also to the electromagnetic wave detection apparatuses according to the second to eighth embodiments, which will be described below.

The electromagnetic wave detection apparatus 10 of the first embodiment separates electromagnetic waves incident from the first imaging unit 15 and propagate electromagnetic waves in the third direction d3 and the fifth direction d5. This configuration enables the electromagnetic wave detection apparatus 10 to match the principal axis of the first imaging unit 15 with the propagation axis of electromagnetic waves propagated in the third direction d3 and the propagation axis of electromagnetic waves propagated in the fifth direction d5. Accordingly, the electromagnetic wave detection apparatus 10 can reduce the deviation of coordinate systems between the first detector 19 and the second detector 20. Such configuration and effect are applicable also to the electromagnetic wave detection apparatuses according to the second to eighth embodiments, which will be described below.

Further, in the information acquisition system 11 of the first embodiment, the controller 14 acquires the information regarding the surroundings, based on electromagnetic waves respectively detected by the first detector 19 and the second detector 20. This configuration enables the information acquisition system 11 to provide useful information based on detected electromagnetic waves. Such configuration and effect are applicable also to the electromagnetic wave detection apparatuses according to the second to eighth embodiments, which will be described below.

Next, an electromagnetic wave detection apparatus according to the second embodiment of the present disclosure will be described. In the second embodiment, a configuration of the second propagation unit is different from that of the first embodiment. Hereinafter, the second embodiment will be described focusing on aspects different from the first embodiment. Note that elements having the same configurations of the elements of the first embodiment will be denoted by the same reference signs.

Figure 4:
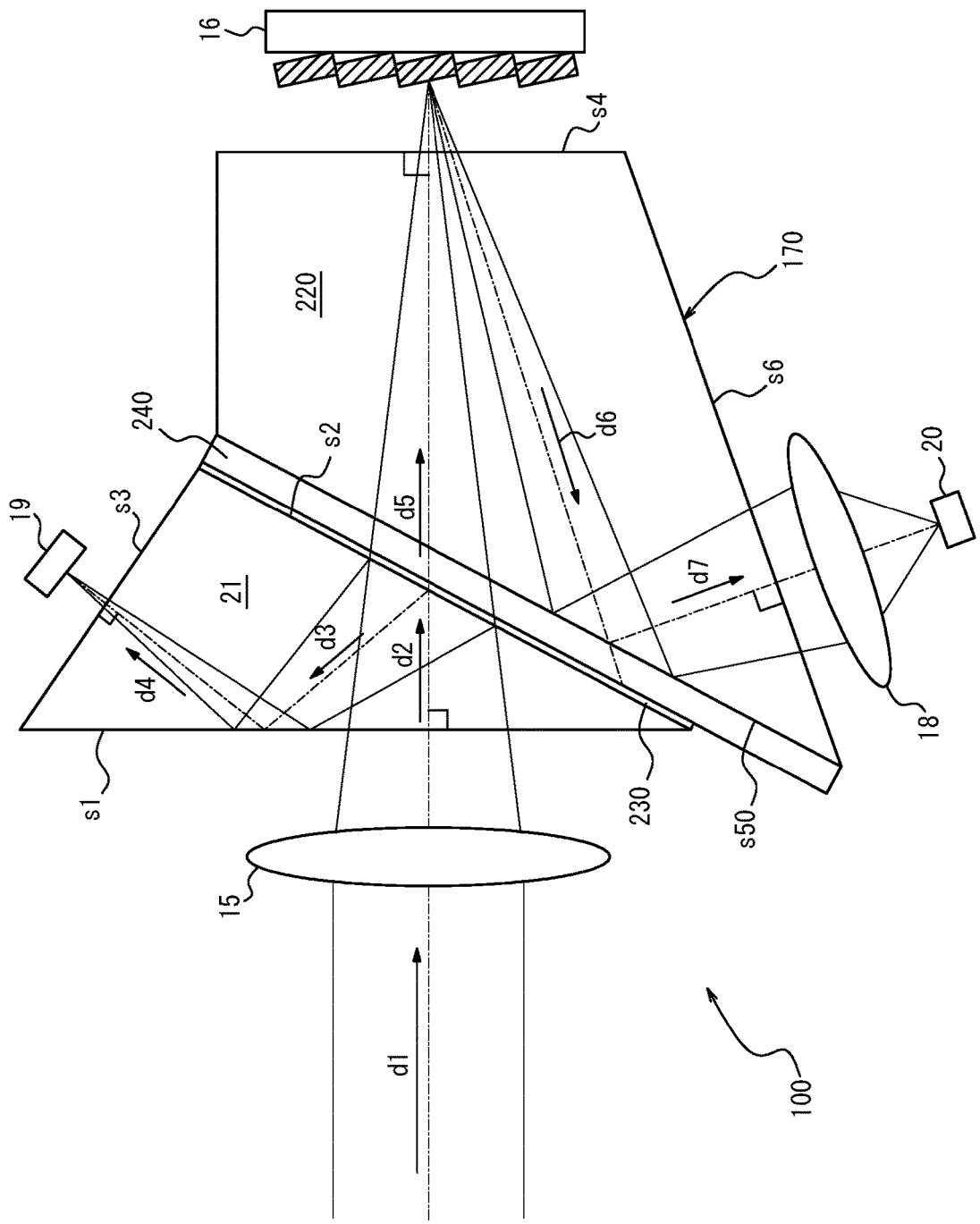
FIG. 4 is a diagram illustrating a schematic configuration of an electromagnetic wave detection apparatus according to a second embodiment.

An electromagnetic wave detection apparatus 100 according to the second embodiment includes the first imaging unit 15, the first propagation unit 16, a second propagation unit 170, the second imaging unit 18, the first detector 19, and the second detector 20, as illustrated in FIG. 4. The information acquisition system 11 of the second embodiment includes the same configuration and function as those of the first embodiment, except for the electromagnetic wave detection apparatus 100. The configurations and functions of the second embodiment are the same as those of the first embodiment, except for the second propagation unit 170.

In the second embodiment, the second propagation unit 170 includes at least the first surface s1, the second surface s2, the third surface s3, the fourth surface s4, the fifth surface s50, and the sixth surface s6, in the same manner as the first embodiment. In the second embodiment, configurations and functions of the first surface s1, the second surface s2, the third surface s3, the fourth surface s4, the fifth surface s5, and the sixth surface s6 are the same as those of the first embodiment. In the second embodiment, the configuration and function of a fifth surface s50 are the same as those of the fifth surface s5 of the first embodiment, except for an object to contact the fifth surface s50.

In the second embodiment, the second propagation unit 170 includes the first prism 21, a second prism 220, a first intermediate layer 230, and a second intermediate layer 240. The configuration and function of the first prism 21 are the same as those of the first embodiment. A configuration of the second prism 220 itself, an arrangement of the second prism 220 with respect to the first prism 21, and the function of the second prism 220 are the same as those of the first embodiment.

The first intermediate layer 230 may be arranged between the first prism 21 and the second prism 220, in the same manner as first embodiment. Further, the first intermediate layer 230 may be in contact with the second surface s2 of the first prism 21 and may include the second surface s2 along the boundary surface with the first prism 21, in the same manner as the first embodiment. The first intermediate layer 230 includes, for example, a visible light reflective coating, a half mirror, a beam splitter, a dichroic mirror, a cold mirror, a hot mirror, a meta surface, or a deflection element, which is attached to the second surface s2, in the same manner as the first embodiment.

The second intermediate layer 240 may be arranged between the fifth surface s50 of the second prism 220 and the first intermediate layer 230. The second intermediate layer 240 may be in contact with the fifth surface s50 of the second prism 220 and may include the fifth surface s50 along the boundary surface with the second prism 220. Further, the second intermediate layer 240 may be in contact with the surface of the first intermediate layer 230 opposite from the surface of the first intermediate layer 230 in contact with the first prism 21.

Figure 5:
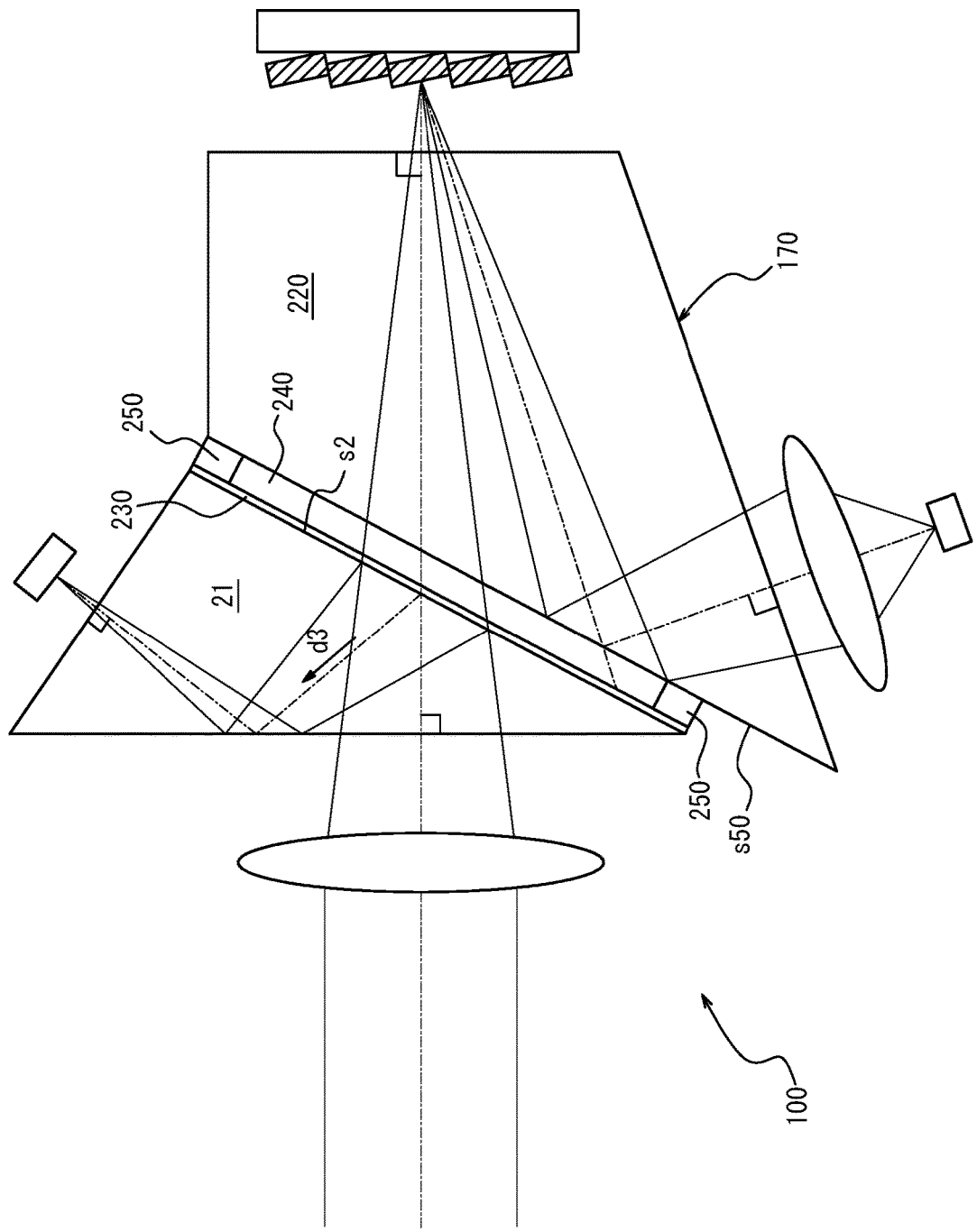
FIG. 5 is a schematic configuration diagram illustrating an example variation of the electromagnetic wave detection apparatus according to the second embodiment.

The second intermediate layer 240 may have a refractive index smaller than that of the second prism 220 and include, for example, at least one of vacuum, a gas, a liquid, and a solid, which has a refractive index smaller than that of the second prism 220. Thus, electromagnetic waves that propagate through the second prism 220 and is incident at an incident angle equal to or larger than the critical angle is totally internally reflected at the fifth surface s50. Accordingly, the fifth surface s50 internally reflects electromagnetic waves that propagate having the propagation axis in the sixth direction d6 within the second prism 220. In a configuration in which the incident angle of electromagnetic waves from the sixth direction d6 is equal to or larger than the critical angle, the fifth surface s50 totally reflects electromagnetic waves that internally propagate in the sixth direction d6 and propagates the electromagnetic waves in the seventh direction d7. In a configuration in which the second intermediate layer 240 is a gas or a liquid, the second intermediate layer 240 may be formed by providing spacers 250 on the respective peripheries of the first intermediate layer 230 and the fifth surface s50 of the second prism 220 as illustrated in FIG. 5 and filling the spacers 250 with a gas or a liquid. In the second embodiment, the second intermediate layer 240 may include an air layer or a prism.

In the electromagnetic wave detection apparatus 100 according to the second embodiment including the above configuration, the fifth surface s50 includes the boundary surface between the second intermediate layer 240 and the second prism 220. This configuration enables the electromagnetic wave detection apparatus 100 to adopt a configuration in which the first intermediate layer 230 may have the function to separate electromagnetic waves incident on the second surface s2 and the second intermediate layer 240 may have the function to propagate electromagnetic waves propagated in the sixth direction d6 in the seventh direction d7. Thus, a flexibility in selecting the material used for the first intermediate layer 230 can be improved.

Next, an electromagnetic wave detection apparatus according to a third embodiment of the present disclosure will be described. The third embodiment is different from the first embodiment, in terms of the configuration of the second propagation unit. Hereinafter, the third embodiment will be described focusing on aspects different from the first embodiment. Note that elements having the same configurations of the elements of the first embodiment or the second embodiment will be denoted by the same reference signs.

Figure 6:
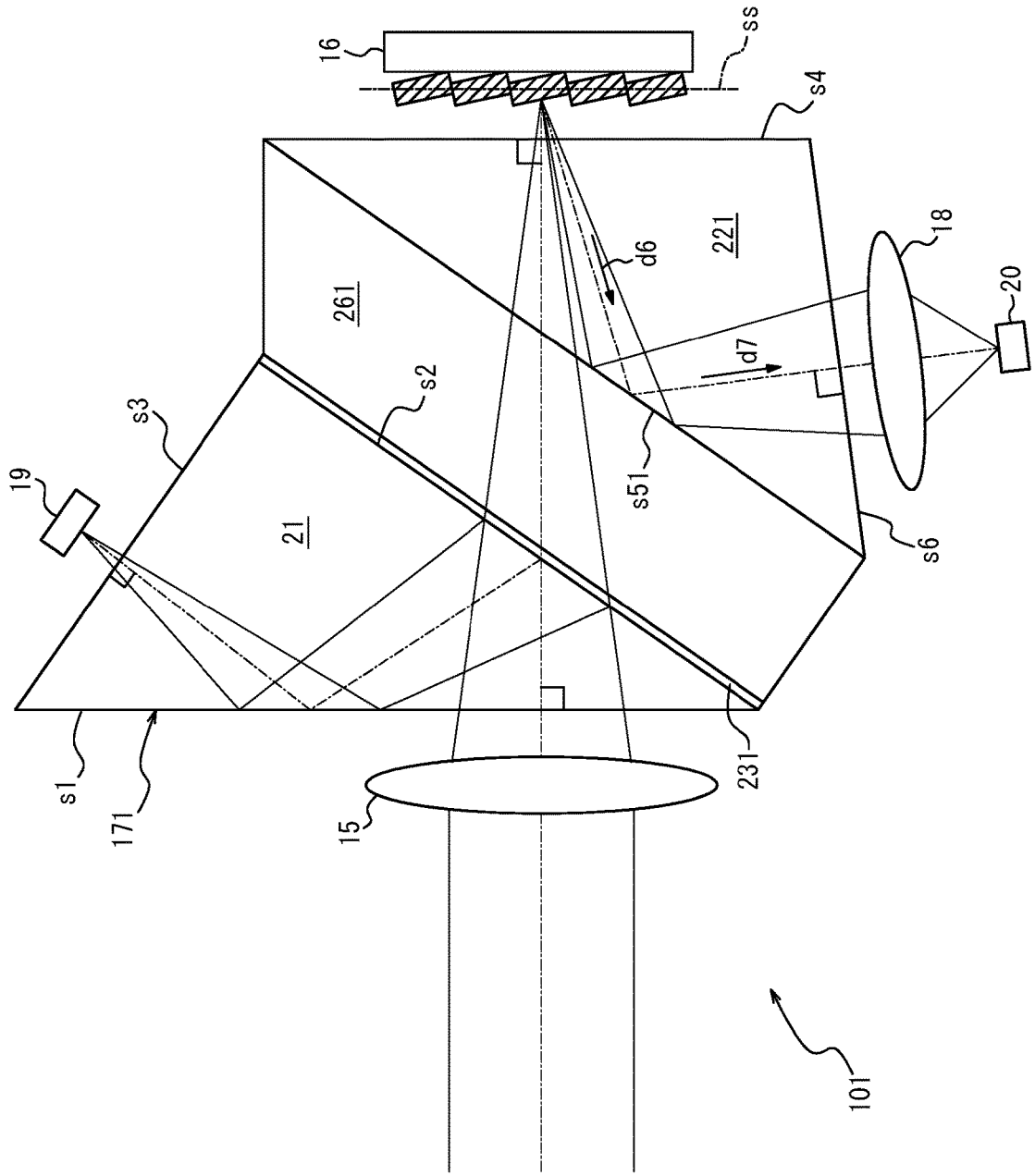
FIG. 6 a diagram illustrating a schematic configuration of an electromagnetic wave detection apparatus according to a third embodiment.

An electromagnetic wave detection apparatus 101 according to the third embodiment includes the first imaging unit 15, the first propagation unit 16, a second propagation unit 171, the second imaging unit 18, the first detector 19, and the second detector 20, as illustrated in FIG. 6. The configuration and function of the information acquisition system 11 according to the third embodiment are the same as those of the first embodiment, except for the electromagnetic wave detection apparatus 101. Configurations and functions of the third embodiment are the same as those of the first embodiment, except for the second propagation unit 171.

In the third embodiment, the second propagation unit 171 includes at least the first surface s1, the second surface s2, the third surface s3, the fourth surface s4, a fifth surface s51, and the sixth surface s6, in the same manner as the first embodiment. In the third embodiment, configurations and functions of the first surface s1, the second surface s2, the third surface s3, the fourth surface s4, and the sixth surface s6 are the same as those of the first embodiment. In the third embodiment, the configuration and function of a fifth surface s51 are the same as those of the first embodiment, except for an object to contact the fifth surface s51.

In the third embodiment, the second propagation unit 171 includes the first prism 21, a second prism 221, a third prism 261, and a first intermediate layer 231. The configuration and the function of the first prism 21 are the same as those of the first embodiment. The configuration of the second prism 221 itself, an arrangement of the second prism 221 with respect to the first prism 21, and the function of the second prism 221 are the same as those of the first embodiment.

The third prism 261 may be arranged between the first intermediate layer 231 and the second prism 221. The third prism may have a refractive index smaller than that of the second prism 211. Thus, electromagnetic waves that propagate through the second prism 221 and is incident at an incident angle equal to or larger than the critical angle are totally internally reflected by the fifth surface s51. Accordingly, the fifth surface s51 internally reflects electromagnetic waves that propagate having a propagation axis in the sixth direction d6 within the second prism 221. In a configuration in which the incident angle of electromagnetic waves from the sixth direction d6 is equal to or larger than the critical angle, the fifth surface s51 totally internally reflects the electromagnetic waves internally propagated in the sixth direction and propagates the electromagnetic waves in the seventh direction d7.

The third prism 261 may be a plate-like member and have one plate surface in contact with the first intermediate layer 231. Another plate surface of the third prism 261 may be in contact with the fifth surface s51 of the second prism 221 and may include the fifth surface s51 along the boundary surface with the second prism 221.

The first intermediate layer 231 may be arranged between the first prism 21 and the third prism 261, in a manner different from the first embodiment. Further, the first intermediate layer 231 may be in contact with the second surface s2 of the first prism 21 and may include the second surface s2 along the boundary surface with the first prism 21, in the same manner as the first embodiment. The first intermediate layer 231 includes, for example, a visible light reflection coating, a half mirror, a beam splitter, a dichroic mirror, a cold mirror, a hot mirror, a meta surface, or a deflection element, which is attached to the second surface s2, in the same manner as the first embodiment.

In the electromagnetic wave detection apparatus 101 of the third embodiment including the above configuration, the second propagation unit 171 includes the third prism 261 which includes the first intermediate layer 231 at the boundary with the first prism 21, and the fifth surface s51 includes the boundary surface between the second prism 221 and the third prism 261. In order to prevent the first detector 19 from interfering with the first prism 21, it is desired to arrange the second surface s2 in the vicinity of the first imaging unit 15. Also, in order to reduce the size of the second imaging unit 18, it is desired to reduce the length of the propagation path of electromagnetic waves that propagate sequentially through the fifth surface s51, the fourth surface s4, the reference surface ss, the fourth surface s4, the fifth surface s51, and then the sixth surface s6. The fifth surface s51 may be preferably arranged in the vicinity of the reference surface ss of the first propagation unit 16. This configuration enables separation between the second surface s2 and the fifth surface s51 in the electromagnetic wave detection apparatus 101, whereby the second surface s2 can be arranged in the vicinity of the first imaging unit 15, and the fifth surface s51 can be arranged in the vicinity of the reference surface ss. As a result, in the electromagnetic wave detection apparatus 101 the size of the second imaging unit 18 can be reduced, while the interference with the first prism 21 by the first detector 19 can be suppressed. Such configuration and effect are applicable also to the electromagnetic wave detection apparatuses according to the fourth to eighth embodiments, which will be described below.

Next, an electromagnetic wave detection apparatus according to a fourth embodiment of the present disclosure will be described. The fourth embodiment is different from the first embodiment, in terms of the configuration of the second propagation unit. Hereinafter, the fourth embodiment will be described focusing on aspects different from the first embodiment. Note that elements having the same configurations of the elements of the first embodiment, the second embodiment, or the third embodiment will be denoted by the same reference signs.

Figure 7:
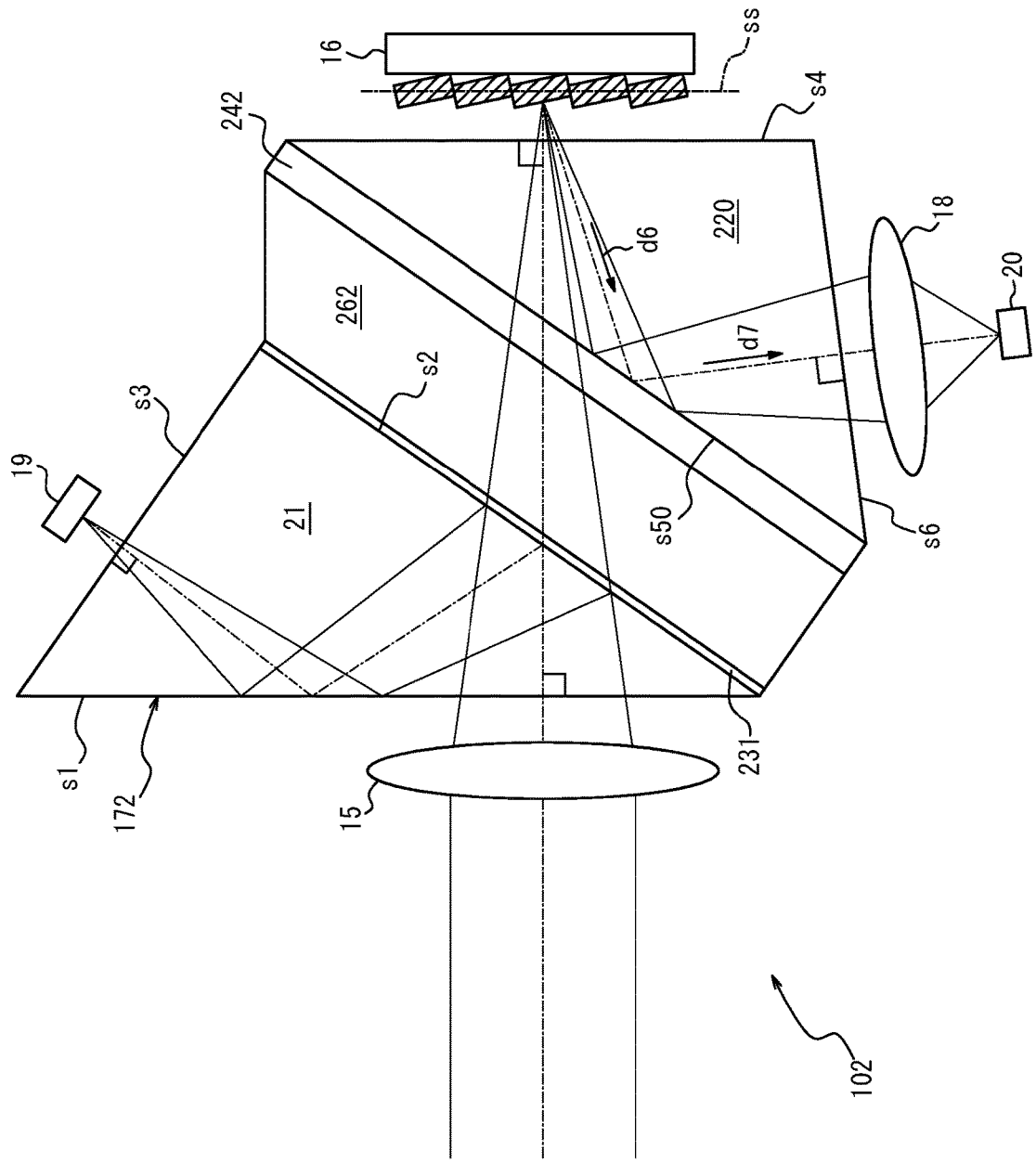
FIG. 7 is a diagram illustrating a schematic configuration of an electromagnetic wave detection apparatus according to a fourth embodiment.

An electromagnetic wave detection apparatus 102 according to the fourth embodiment includes the first imaging unit 15, the first propagation unit 16, a second propagation unit 172, the second imaging unit 18, the first detector 19, and the second detector 20, as illustrated in FIG. 7. The configuration and function of the information acquisition system 11 according to the fourth embodiment are the same as those of the first embodiment, except for the electromagnetic wave detection apparatus 102. Configurations and functions of the fourth embodiment are the same as those of the first embodiment, except for the second propagation unit 172.

In the fourth embodiment, the second propagation unit 172 includes at least the first surface s1, the second surface s2, the third surface s3, the fourth surface s4, the fifth surface s50, and the sixth surface s6, in the same manner as the first embodiment. In the fourth embodiment, configurations and functions of the first surface s1, the second surface s2, the third surface s3, the fourth surface s4, and the sixth surface s6 are the same as those of the first embodiment. In the fourth embodiment, the configuration and function of the fifth surface s50 are the same as those of the first embodiment, except for an object to contact the fifth surface s50.

In the fourth embodiment, the second propagation unit 172 includes, for example, a total internal reflection prism, and includes the first prism 21, the second prism 220, a third prism 262, the first intermediate layer 231, and a second intermediate layer 242. The configuration and the function of the first prism 21 and the first intermediate layer 231 are the same as those of the third embodiment. The configuration of the second prism 221 itself, an arrangement thereof with respect to the first prism 21, and the function of the second prism 221 are the same as those of the first embodiment. A configuration of the third prism 262 itself, an arrangement thereof with respect to the first prism 21, and the function of the third prism 262 are the same as those of the first embodiment. Thus, the first intermediate layer 231 may be arranged between the first prism 21 and the second intermediate layer 242. Further, the first intermediate layer 231 may include the second surface s2 along the boundary surface with the first prism 21.

The second intermediate layer 242 may be arranged between the second prism 220 and the third prism 262. The second intermediate layer 242 may be in contact with the fifth surface s50 of the second prism 220 and may include the second fifth surface s50 along the boundary surface with the second prism 220, in the same manner as the second embodiment. The second intermediate layer 242 may be in contact with the surface of the third prism 262 opposite from the surface of the third prism 262 in contact with the first intermediate layer 231.

Figure 8:
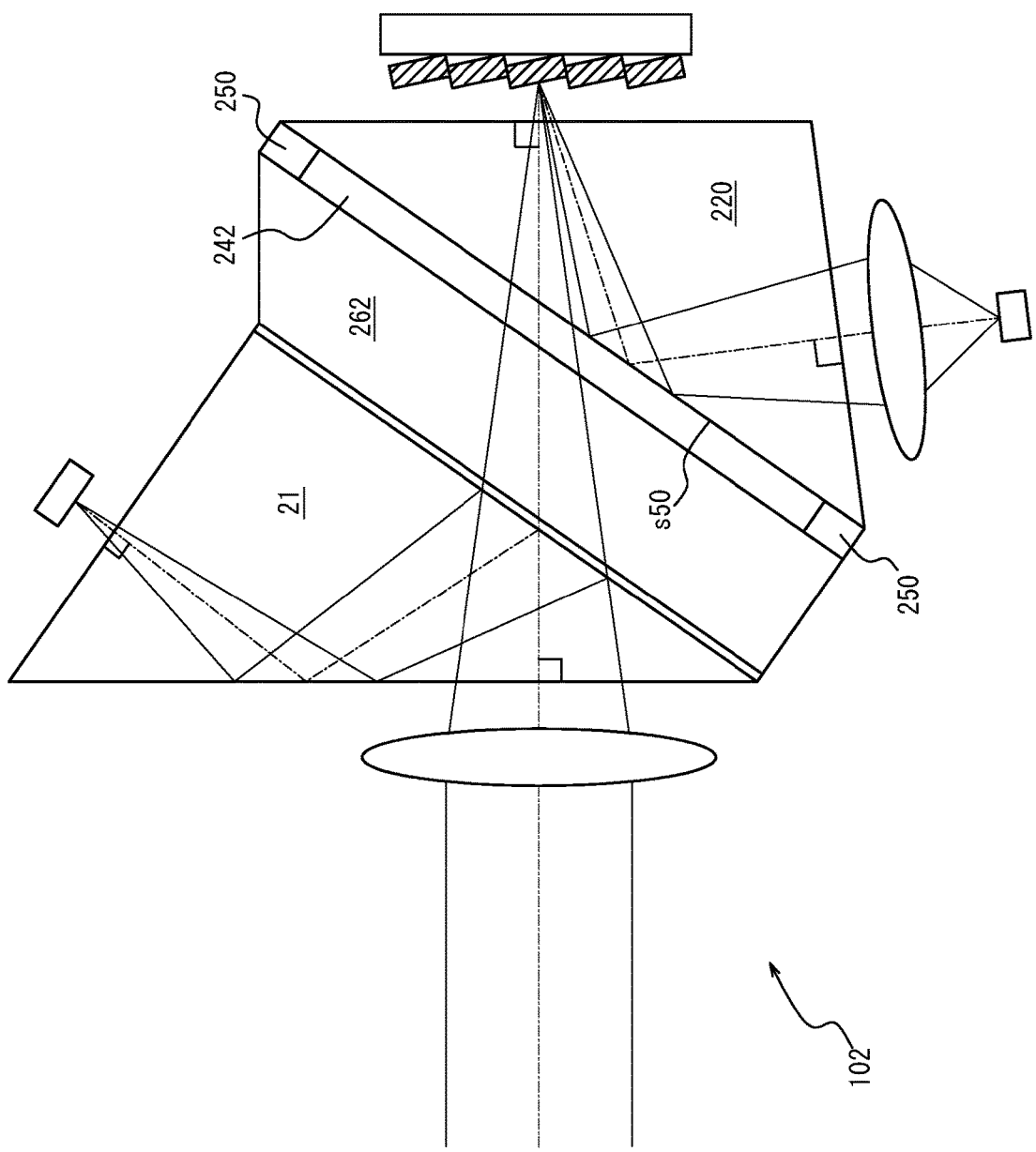
FIG. 8 is a schematic configuration diagram illustrating an example variation of the electromagnetic wave detection apparatus according to the fourth embodiment.

The second intermediate layer has the refractive index smaller than that of the second prism 220 in the same manner as the second embodiment and includes at least one of, for example, a gas, a liquid, or a solid that has a refractive index smaller than that of the second prism 220. Thus, electromagnetic waves propagating through the second prism 220 and incident at an incident angle equal to or larger than the critical angle are totally internally reflected by the fifth surface s50. Accordingly, the fifth surface s50 internally reflects electromagnetic waves propagating having the propagation axis in the sixth direction d6 within the second prism 220. In a configuration in which the incident angle of electromagnetic waves incident from the sixth direction d6 is equal to or larger than the critical angle, the fifth surface s50 totally internally reflects electromagnetic waves internally propagated in the sixth direction d6 and propagates the electromagnetic waves in the seventh direction d7. In a configuration in which the second intermediate layer 242 is a gas or a liquid, the second intermediate layer 242 may be formed by providing spacers 250 on the respective peripheries of the third prism 262 and the fifth surface s50 of the second prism 220 as illustrated in FIG. 8 and filling the spacers 250 with a gas or a liquid. In the fourth embodiment, the second intermediate layer 242 may include an air layer or a prism.

Next, an electromagnetic wave detection apparatus according to a fifth embodiment of the present disclosure will be described. The fifth embodiment is different from the first embodiment, in terms of the configuration of the second propagation unit. Hereinafter, the fifth embodiment will be described focusing on aspects different from the first embodiment. Note that elements having the same configurations of the elements of the first embodiment, the second embodiment, the third embodiment, or the fourth embodiment will be denoted by the same reference signs.

Figure 9:
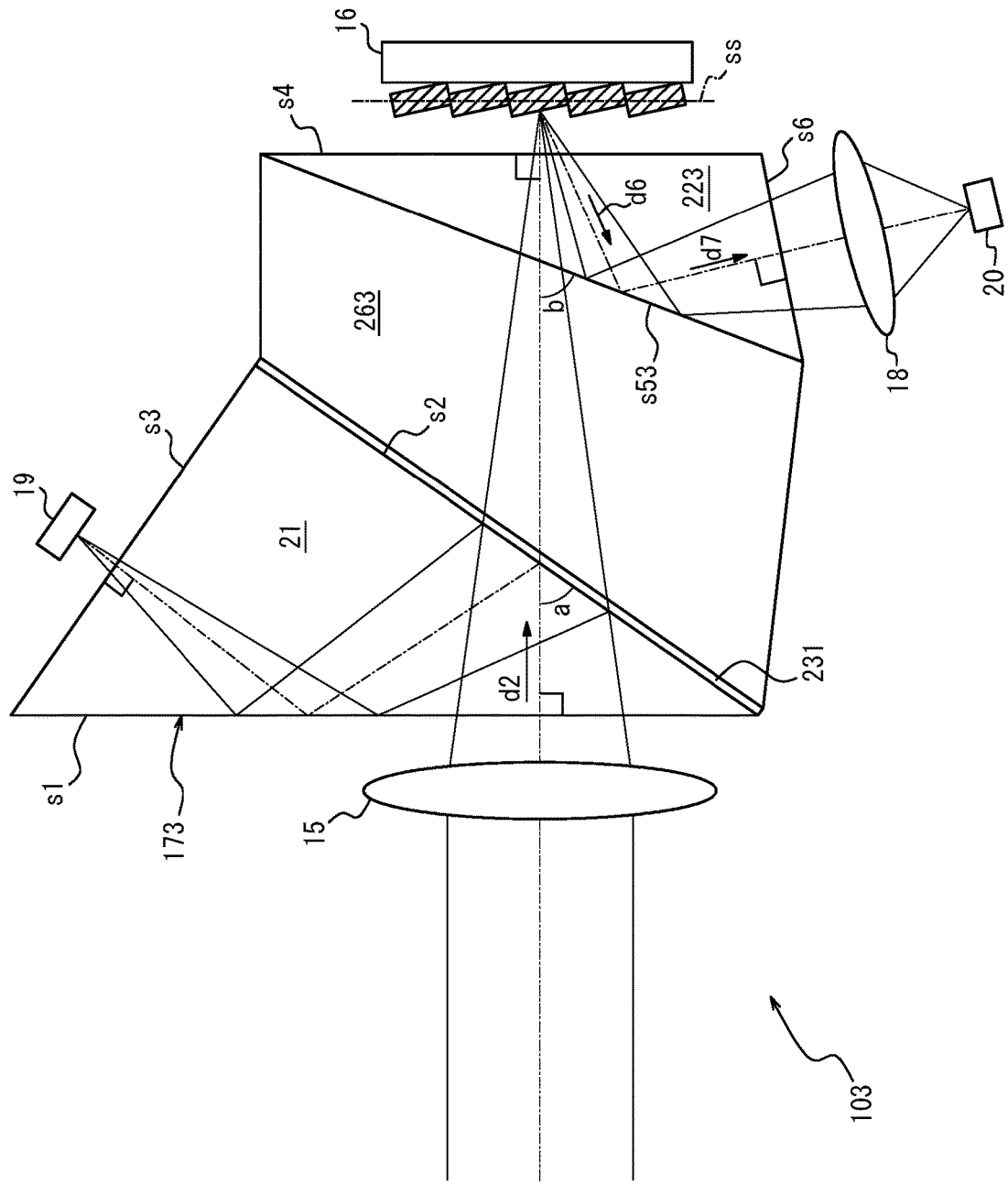
FIG. 9 is a diagram illustrating a schematic configuration of an electromagnetic wave detection apparatus according to a fifth embodiment.

An electromagnetic wave detection apparatus 103 according to the fifth embodiment includes the first imaging unit 15, the first propagation unit 16, a second propagation unit 173, the second imaging unit 18, the first detector 19, and the second detector 20, as illustrated in FIG. 9. The configuration and functions of the information acquisition system 11 according to the fifth embodiment are the same as those of the first embodiment, except for the electromagnetic wave detection apparatus 103. The configuration and function of the fifth embodiment are the same as those of the first embodiment, except for the second propagation unit 173.

In the fifth embodiment, the second propagation unit 173 includes at least the first surface s1, the second surface s2, the third surface s3, the fourth surface s4, a fifth surface s53, and the sixth surface s6, in the same manner as the first embodiment. In the fifth embodiment, configurations and functions of the first surface s1, the second surface s2, the third surface s3, the fourth surface s4, and the sixth surface s6 are the same as those of the first embodiment.

The fifth surface s53 may propagate electromagnetic waves propagated in the sixth direction d6 from the fourth surface s4 in the seventh direction d7, in the same manner as the first embodiment. The fifth surface s53 may internally reflect the electromagnetic waves propagated in the sixth direction d6 from the fourth surface s4 and propagate the electromagnetic waves in the seventh direction d7, in the same manner as the first embodiment. The fifth surface s53 may totally internally reflect the electromagnetic waves propagated in the sixth direction d6 from the fourth surface s4 and propagate the electromagnetic waves in the seventh direction d7, in the same manner as the first embodiment. The incident angle of the electromagnetic waves propagated in the sixth direction d6 from the fourth surface s4 with respect to the fifth surface s53 may be equal to or larger than the critical angle, in the same manner as the first embodiment.

The incident angle of the electromagnetic waves propagated in the sixth direction d6 from the fourth surface s4 with respect to the fifth surface s53 may be equal to or different from an incident angle of electromagnetic waves propagated in the second direction d2 from the first surface s1 with respect to the second surface s2, in a manner different from the first embodiment. The incident angle of the electromagnetic waves propagated in the sixth direction d6 from the fourth surface s4 with respect to the fifth surface s53 may be larger or smaller than the incident angle of the electromagnetic waves propagated in the second direction d2 from the first surface s1 with respect to the second surface s2, in a manner different from the first embodiment. The fifth surface s53 may not be parallel to the second surface s2, in a manner different from the first embodiment.

In the fifth embodiment, the second propagation unit 173 may include the first prism 21, a second prism 223, a third prism 263, and the first intermediate layer 231. The configurations and functions of the first prism 21 and the first intermediate layer 231 are the same as those of the third embodiment.

The second prism 223 may include the fourth surface s4, the fifth surface s53, and the sixth surface s6 as separate different surfaces, in the same manner as the first embodiment. The second prism 223 includes, for example, a triangular prism in which the fourth surface s4, the fifth surface s5, and the sixth surface s6 intersect with one another.

The second prism 223 is arranged such that the fifth surface s53 opposes the second surface s2 of the first prism 21, in the same manner as the first embodiment. The second prism 223 is arranged such that the fourth surface s4 is located in the propagation direction of electromagnetic waves propagating through the second prism 223 via the first surface s5 after being transmitted through the second surface s2 of the first prism 21, in the same manner as the first embodiment. Further, the second prism 223 is arranged such that the sixth surface s6 is located in the seventh direction d7, which is a reflection angle equal to the incident angle of electromagnetic waves incident from the sixth direction d6 with respect to the fifth surface s53, in the same manner as the first embodiment.

The second prism 223 may be arranged such that an angle b formed by the second direction d2 and the fifth surface s53 is larger than an angle a formed by the second direction d2 and the second surface s2, in a manner different from the first embodiment.

For example, the second prism 223 may be arranged with respect to the first prism 21, in a manner in which the fifth surface s53 is rotated in a direction remote from the first prism 21 about an intersection line of the fourth surface s4 and the fifth surface s53, that is, in a manner in which the fifth surface s53 is rotated in a direction approaching the fourth surface s4.

The third prism 263 is arranged between the first intermediate layer 231 and the second prism 223, in the same manner as the third embodiment. The third prism 263 has a refractive index smaller than that of the second prism 223, in the same manner as the third embodiment. Thus, electromagnetic waves that propagating through the second prism 223 and is incident at an incident angle equal to or larger than the critical angle after propagating through the second prism 223 are totally internally reflected by the fifth surface s53, in the same manner as the third embodiment. Accordingly, the fifth surface s53 internally reflects the electromagnetic waves that propagate having the propagation axis in the sixth direction d6 within the second prism 223, in the same manner as the third embodiment. In a configuration in which the incident angle of the electromagnetic waves propagating from the sixth direction d6 is equal to or larger than the critical angle, the fifth surface s53 totally internally reflects electromagnetic waves internally propagated in the sixth direction d6 and propagates the electromagnetic waves in the seventh direction d7, in the same manner as the third embodiment.

In the fifth embodiment, the third prism 263 includes, for example, a prism including surfaces inclined with respect to one another, in a manner different from the third embodiment. One surface of the third prism 263 may contact the first intermediate layer 231, in a manner similar to the third embodiment. Another surface of the third prism 263 may be in contact with the fifth surface s53 of the second prism 223 and may include the fifth surface s53 along the boundary surface with the second prism 223, in a manner similar to the third embodiment.

In the electromagnetic wave detection apparatus 103 of the fifth embodiment having the above configuration, the incident angle of electromagnetic waves propagated in the second direction d2 with respect to the second surface s2 is smaller than the incident angle of electromagnetic waves incident again from the reference surface ss via the fourth surface s4 with respect to the fifth surface s53. This configuration enables the electromagnetic wave detection apparatus 103 to have the configuration in which the second prism 223 is arranged with respect to the first prism 21, in a manner in which the fifth surface s53 is rotated in a direction remote from the first prism 21 about the intersection line of the fourth surface s4 and the fifth surface s53, that is, in a manner in which the fifth surface s53 is rotated in a direction approaching the fourth surface s4. Thus, the electromagnetic wave detection apparatus 103 can reduce the distance between the reference surface ss of the first propagation unit 16 and the fifth plane s53. As a result, the electromagnetic wave detection apparatus 103 can reduce the length of the propagation path of electromagnetic waves that propagate through the fifth surface s53, the fourth surface s4, the reference surface ss, the fourth surface s4, the fifth surface s53, and then the sixth surface s6, whereby the second imaging unit 18 can be further downsized. Such configuration and effect are applicable also to the electromagnetic wave detection apparatus according to the sixth embodiment, which will be described below.

Next, an electromagnetic wave detection apparatus according to a sixth embodiment of the present disclosure will be described. The sixth embodiment is different from the first embodiment, in terms of the configuration of the second propagation unit. Hereinafter, the sixth embodiment will be described focusing on aspects different from the first embodiment. Note that elements having the same configurations of the elements of the first embodiment, the second embodiment, the third embodiment, the fourth embodiment, or the fifth embodiment will be denoted by the same reference signs.

Figure 10:
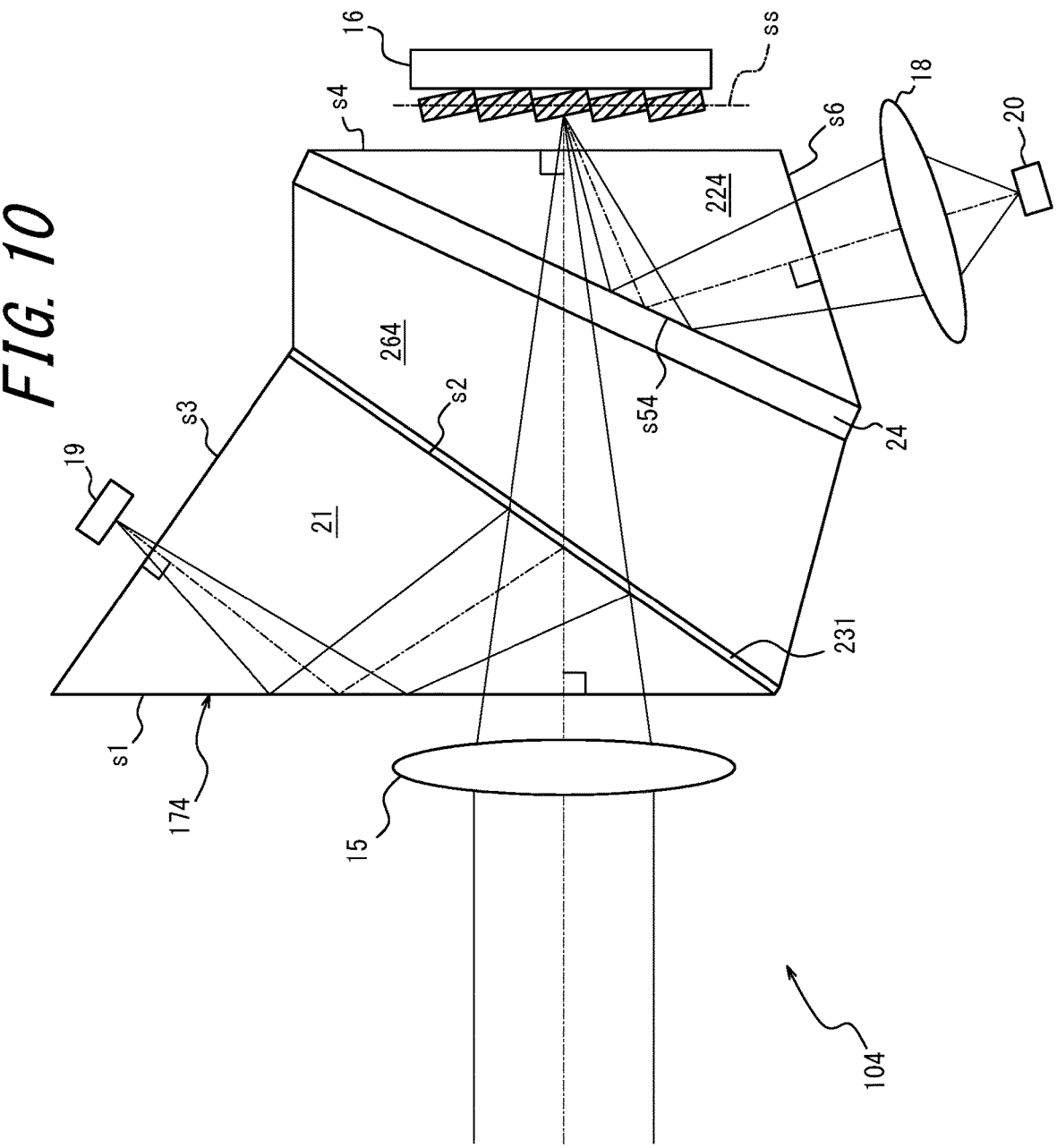
FIG. 10 is a diagram illustrating a schematic configuration of an electromagnetic wave detection apparatus according to a sixth embodiment.

An electromagnetic wave detection apparatus 104 according to the sixth embodiment includes the first imaging unit 15, the first propagation unit 16, a second propagation unit 174, the second imaging unit 18, the first detector 19, and the second detector 20, as illustrated in FIG. 10. The configuration and functions of the information acquisition system 11 according to the sixth embodiment are the same as those of the first embodiment, except for the electromagnetic wave detection apparatus 104. The configuration and function of the sixth embodiment are the same as those of the first embodiment, except for the second propagation unit 174.

In the sixth embodiment, the second propagation unit 174 includes at least the first surface s1, the second surface s2, the third surface s3, the fourth surface s4, a fifth surface s54, and the sixth surface s6, in the same manner as the first embodiment. In the sixth embodiment, configurations and functions of the first surface s1, the second surface s2, the third surface s3, the fourth surface s4, and the sixth surface s6 are the same as those of the first embodiment. In the sixth embodiment, configurations and functions of the fifth surface s54 are the same as those of the fifth embodiment, except for an object to contact the fifth surface s54.

In the sixth embodiment, the second propagation unit 174 includes a total internal reflection prism, and includes the first prism 21, a second prism 224, a third prism 264, the first intermediate layer 231, and the second intermediate layer 242. The configuration and the function of the first prism 21 and the first intermediate layer 231 are the same as those of the third embodiment. The configurations of the second prism 224 and the third prism 264 themselves, arrangements of the second prism 224 and the third prism 264 with respect to the first prism 21, and the functions of second prism 224 and the third prism 264 are the same as those of the fifth embodiment. Thus, the first intermediate layer 231 is arranged between the first prism 21 and the second intermediate layer 242. Further, the first intermediate layer 231 may include the second surface s2 along the boundary surface with the first prism 21.

Figure 11:
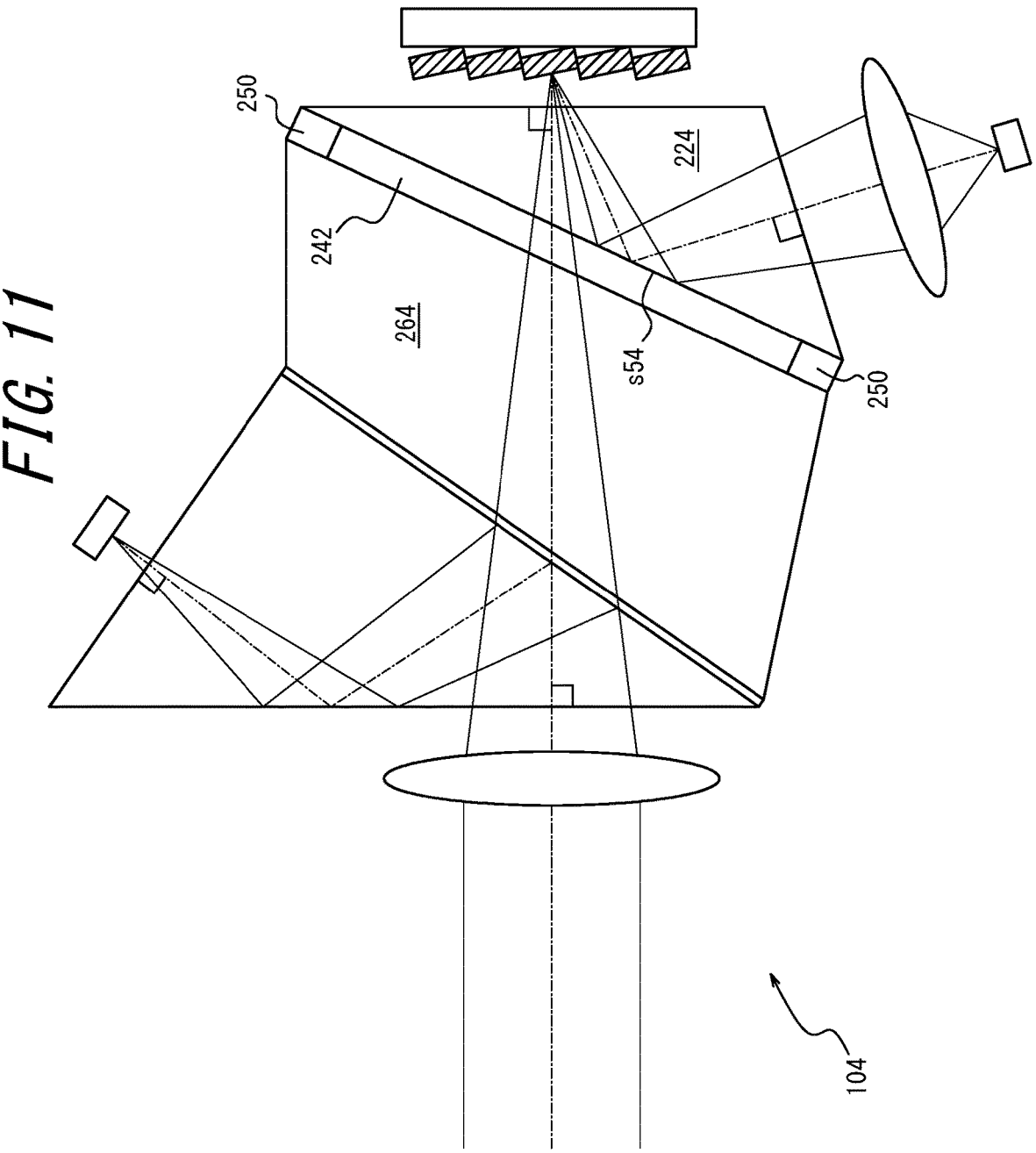
FIG. 11 is a schematic configuration diagram illustrating an example variation of the electromagnetic wave detection apparatus according to the sixth embodiment.

In the sixth embodiment, the configuration and function of the second intermediate layer 242 is the same as those of the fourth embodiment. Thus, the second intermediate layer 242 has a refractive index smaller than that of the second prism 224 in the same manner as the fourth embodiment, and includes at least any one of, for example, vacuum, a gas, a liquid, and a solid, which has a refractive index smaller than that of the second prism 224. In a configuration in which the second intermediate layer 242 is a gas or a liquid, the second intermediate layer 242 may be formed by providing spacers 250 on the respective peripheries of the third prism 264 and the fifth surface s50 of the second prism 224 as illustrated in FIG. 11 and filling the spacers 250 with a gas or a liquid. In the sixth embodiment, the second intermediate layer 242 may include an air layer or a prism.

Next, an electromagnetic wave detection apparatus according to a seventh embodiment of the present disclosure will be described. The seventh embodiment is different from the first embodiment, in terms of the configuration of the second propagation unit. Hereinafter, the seventh embodiment will be described focusing on aspects different from the first embodiment. Note that elements having the same configurations of the elements of the first embodiment, the second embodiment, the third embodiment, the fourth embodiment, the fifth embodiment, or the sixth embodiment will be denoted by the same reference signs.

Figure 12:
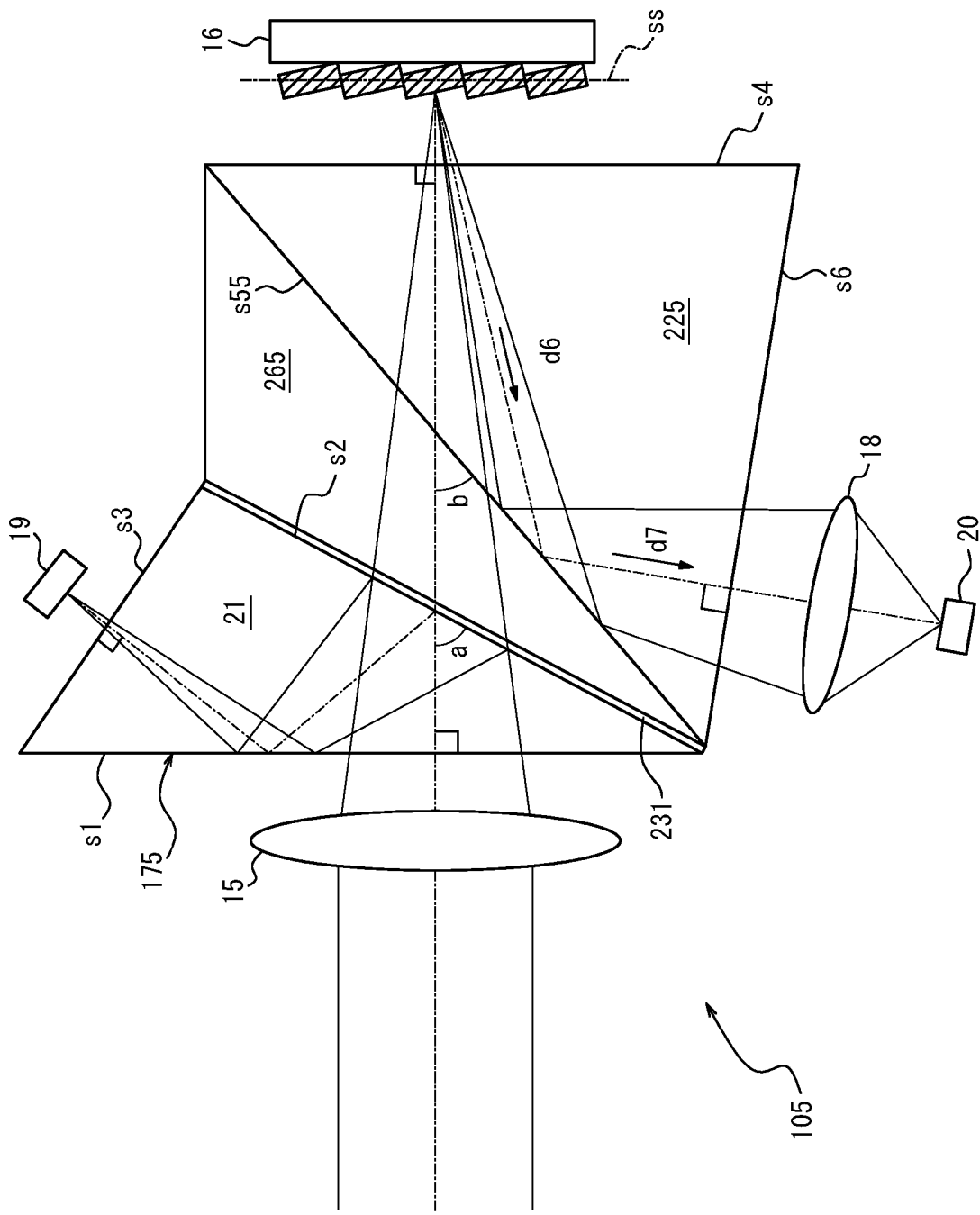
FIG. 12 is a diagram illustrating a schematic configuration of an electromagnetic wave detection apparatus according to a seventh embodiment.

An electromagnetic wave detection apparatus 105 according to the seventh embodiment includes the first imaging unit 15, the first propagation unit 16, a second propagation unit 175, the second imaging unit 18, the first detector 19, and the second detector 20, as illustrated in FIG. 12. The configuration and functions of the information acquisition system 11 according to the seventh embodiment are the same as those of the first embodiment, except for the electromagnetic wave detection apparatus 105. The configuration and function of the seventh embodiment are the same as those of the first embodiment, except for the second propagation unit 175.

In the seventh embodiment, the second propagation unit 175 includes at least the first surface s1, the second surface s2, the third surface s3, the fourth surface s4, a fifth surface s55, and the sixth surface s6, in the same manner as the first embodiment. In the seventh embodiment, configurations and functions of the first surface s1, the second surface s2, the third surface s3, the fourth surface s4, and the sixth surface s6 are the same as those of the first embodiment.

The fifth surface s55 may propagate electromagnetic waves propagated in the sixth direction d6 from the fourth surface s4 in the seventh direction d7, in the same manner as the first embodiment. The fifth surface s55 may internally reflect the electromagnetic waves propagated in the sixth direction d6 from the fourth surface s4 and propagate the electromagnetic waves in the seventh direction d7, in the same manner as the first embodiment. The fifth surface s55 may totally internally reflect the electromagnetic waves propagated in the sixth direction d6 from the fourth surface s4 and propagate the electromagnetic waves to the seventh direction d7, in the same manner as the first embodiment. An incident angle of the electromagnetic waves propagated in the sixth direction d6 from the fourth surface s4 with respect to the fifth surface s55 may be equal to or larger than the critical angle, in the same manner as the first embodiment. The incident angle of the electromagnetic waves propagated in the sixth direction d6 from the fourth surface s4 with respect to the fifth surface s55 may be different from an incident angle of the electromagnetic waves propagated in the second direction d2 from the first surface s1 with respect to the second surface s2. The incident angle of the electromagnetic waves propagated in the sixth direction d6 from the fourth surface s4 with respect to the fifth surface s55 may be larger than the incident angle of the electromagnetic waves propagated in the second direction d2 from the first surface s1 with respect to the second surface s2.

The fifth surface s55 may not be parallel to the second surface s2, in a manner different from the first embodiment.

In the seventh embodiment, the second propagation unit 175 includes the first prism 21, a second prism 225, a third prism 265, and the first intermediate layer 231. The configurations and functions of the first prism 21 and the first intermediate layer 231 are the same as those of the third embodiment. The function of the third prism 265 is similar to that of the fifth embodiment.

The second prism 225 may include the fourth surface s4, the fifth surface s55, and the sixth surface s6 as separate different surfaces, in the same manner as the first embodiment. The second prism 225 may include, for example, a triangular prism in which the fourth surface s4, the fifth surface s55, and the sixth surface s6 intersect with one another.

The second prism 225 may be arranged such that the fifth surface s55 opposes the second surface s2 of the first prism 21, in the same manner as the first embodiment. The second prism 225 may be arranged such that the fourth surface s4 is located in the propagation direction of electromagnetic waves propagating through the second prism 225 via the fifth surface s55 after being transmitted from the second surface s2 of the first prism 21, in the same manner as the first embodiment. The second prism 225 may be arranged such that the sixth surface s6 is located in the seventh direction d7, which is a reflection angle equal to the incident angle of electromagnetic waves incident from the sixth direction d6 with respect to the fifth surface s55, in the same manner as the first embodiment.

The second prism 225 may be arranged such that an angle b formed by the second direction d2 and the fifth surface s55 is smaller than an angle a formed by the second direction d2 and the second surface s2, in a manner different from the first embodiment.

For example, the second prism 225 may be arranged with respect to the first prism 21, in a manner in which the fifth surface s55 is rotated in a direction remote from the first prism 21 about an intersection line of the fifth surface s55 and the sixth surface s6, that is, in a manner in which the fifth surface s55 is rotated in a direction approaching the sixth surface s6.

In the electromagnetic wave detection apparatus 105 according to the seventh embodiment including the above configuration, the second prism 225 is arranged with respect to the first prism 21, in the manner in which the fifth surface s55 is rotated in a direction remote from the first prism 21 about the intersection line of the fifth surface s55 and the sixth surface s6, that is, in the manner in which the fifth surface s55 is rotated in a direction approaching the sixth surface s6. This configuration enables the electromagnetic wave detection apparatus 105 to further reduce the angle formed by the fifth surface s55 and the sixth direction d6, which is the propagation axis of electromagnetic waves that propagating after being incident again on the fourth surface s4 from the reference surface ss. Thus, the electromagnetic wave detection apparatus 105 can increase the incident angle of electromagnetic waves propagated in the sixth direction d6 with respect to the fifth surface s55, and thus can increase components that do not pass through the surface s55 but is reflected thereby, from among a bundle of electromagnetic waves that is emitted and propagated in the sixth direction d6. As a result, the electromagnetic wave detection apparatus 105 has a large ratio of electromagnetic waves incident on the second detector 20 and thus can improve detection sensitivity. Such configuration and effect are applicable also to the electromagnetic wave detection apparatus according to the eighth embodiment, which will be described below.

Next, an electromagnetic wave detection apparatus according to an eighth embodiment of the present disclosure will be described. The eighth embodiment is different from the first embodiment, in terms of the configuration of the second propagation unit. Hereinafter, the eighth embodiment will be described focusing on aspects different from the first embodiment. Note that elements having the same configurations of the elements of the first embodiment, the second embodiment, the third embodiment, the fourth embodiment, the fifth embodiment, the sixth embodiment, or the seventh embodiment will be denoted by the same reference signs.

Figure 13:
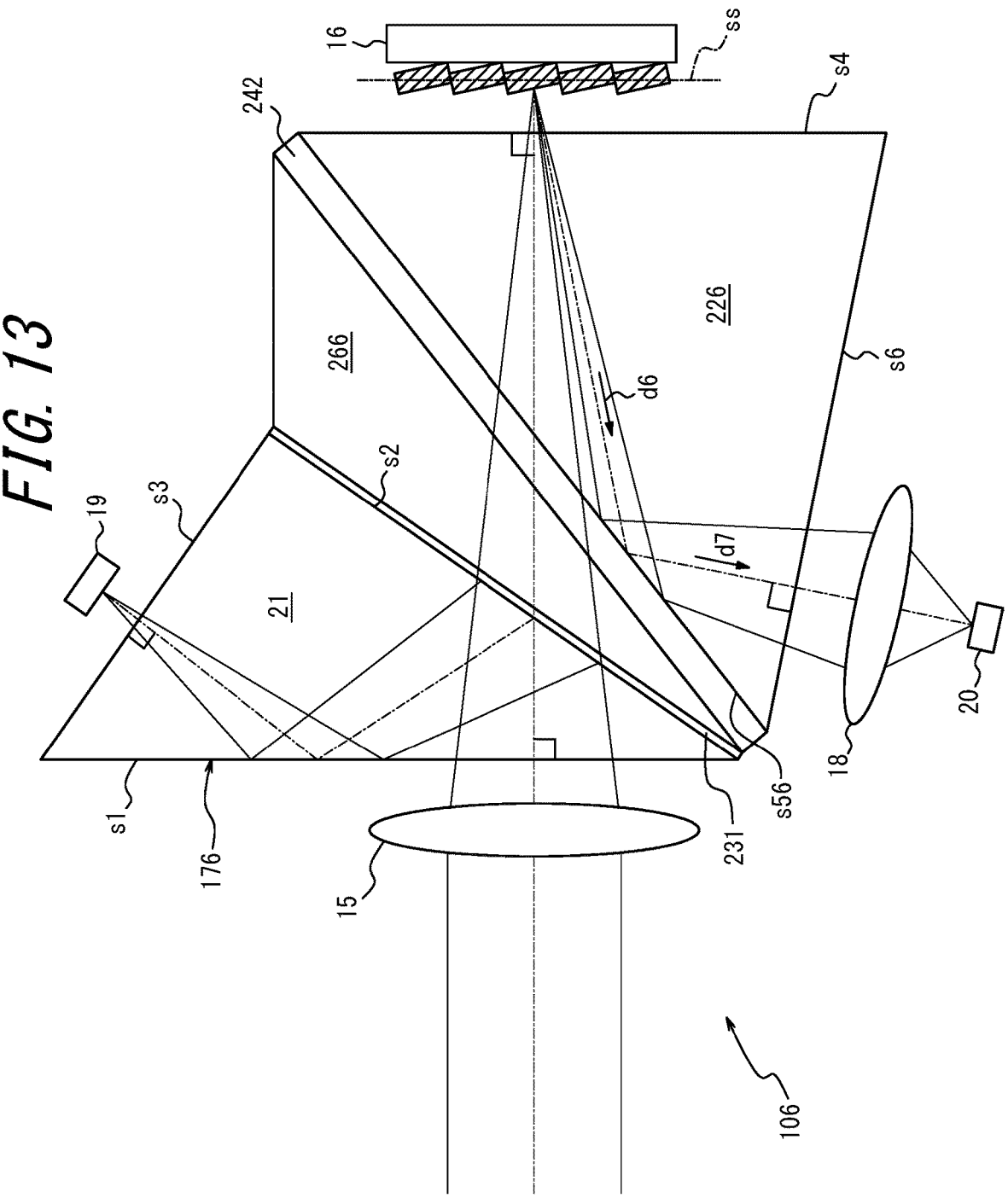
FIG. 13 is a diagram illustrating a schematic configuration of an electromagnetic wave detection apparatus according to an eighth embodiment.

An electromagnetic wave detection apparatus 106 according to the eighth embodiment includes the first imaging unit 15, the first propagation unit 16, a second propagation unit 176, the second imaging unit 18, the first detector 19, and the second detector 20, as illustrated in FIG. 13. The configuration and functions of the information acquisition system 11 according to the eighth embodiment are the same as those of the first embodiment, except for the electromagnetic wave detection apparatus 106. The configuration and function of the eighth embodiment are the same as those of the first embodiment, except for the second propagation unit 176.

In the eighth embodiment, the second propagation unit 176 includes at least the first surface s1, the second surface s2, the third surface s3, the fourth surface s4, a fifth surface s56, and the sixth surface s6, in the same manner as the first embodiment. In the eighth embodiment, configurations and functions of the first surface s1, the second surface s2, the third surface s3, the fourth surface s4, and the sixth surface s6 are the same as those of the first embodiment. In the eighth embodiment, the configuration and function of the fifth surface s56 are the same as those of the seventh embodiment, except for an object to contact the fifth surface s56.

In the eighth embodiment, the second propagation unit 176 includes a total internal reflection prism and includes the first prism 21, a second prism 226, a third prism 266, the first intermediate layer 231, and the second intermediate layer 242. Configurations and functions of the first prism 21 and the first intermediate layer 231 are the same as those of the third embodiment. Configurations of the second prism 226 and the third prism 266 themselves, arrangements of the second prism 226 and the third prism 266 with respect to the first prism 21, and functions of the second prism 226 and the third prism 266 are the same as those of the seventh embodiment. Thus, the first intermediate layer 231 may be arranged between the first prism 21 and the second intermediate layer 242. Further, the first intermediate layer 231 may include the second surface s2 along the boundary surface with the first prism 21.

Figure 14:
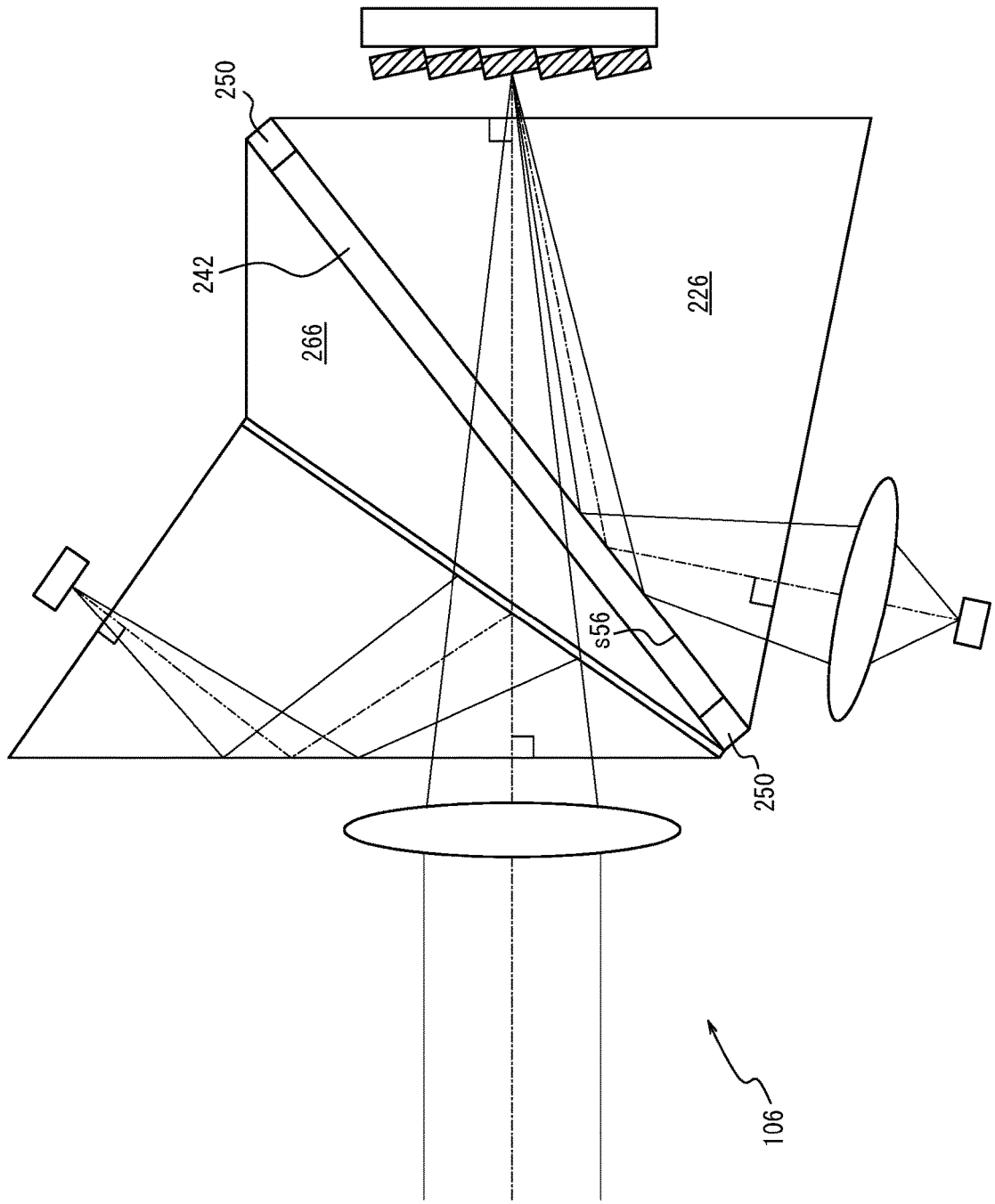
FIG. 14 is a schematic configuration diagram illustrating an example variation of the electromagnetic wave detection apparatus according to the eighth embodiment.

In the eighth embodiment, the configuration and function of the second intermediate layer 242 are the same as that of the fourth embodiment. Thus, the second intermediate layer 242 has a refractive index smaller than that of the second prism 226 in the same manner as the fourth embodiment, and includes at least any one of, for example, vacuum, a gas, a liquid, and a solid, which has a refractive index smaller than that of the second prism 226. In a configuration in which the second intermediate layer 242 is a gas or a liquid, the second intermediate layer 242 may be formed by providing spacers 250 on the respective peripheries of the third prism 266 and the fifth surface s56 of the second prism 226 as illustrated in FIG. 14 and filling the spacers 250 with a gas or a liquid. In the eighth embodiment, the second intermediate layer 242 may include an air layer or a prism.

Although the present disclosure has been described based on the figures and the embodiments, it should be appreciated that those who are skilled in the art may easily perform variations or alterations based on the present disclosure. Accordingly, such variations and alterations are to be included in the scope of the present disclosure.

For example, although the radiation unit 12, the scanner 13, and the controller 14 constitute the information acquisition system 11 together with the electromagnetic wave detection apparatus 10, 100, 101, 102, 103, 104, 105, or 106 in the first to eighth embodiments, the electromagnetic wave detection apparatus 10, 100, 101, 102, 103, 104, 105, and 106 may include at least one of them.

Although the first propagation unit 16 can switch the propagation direction of the electromagnetic waves incident on the reference surface ss in the two directions: the first selection direction ds1 and the second selection direction ds2 in the first to eighth embodiments, the first propagation unit 16 can switch the propagation direction between three or more directions, rather than two directions.

Further, although the first state and the second state of the first propagation unit 16 in the first to eighth embodiments are respectively the state to reflect electromagnetic waves incident on the reference surface ss in the first selection direction ds1 and the state to reflect the electromagnetic waves in the second selection direction ds2, these states may refer to other conditions.

Figure 15:
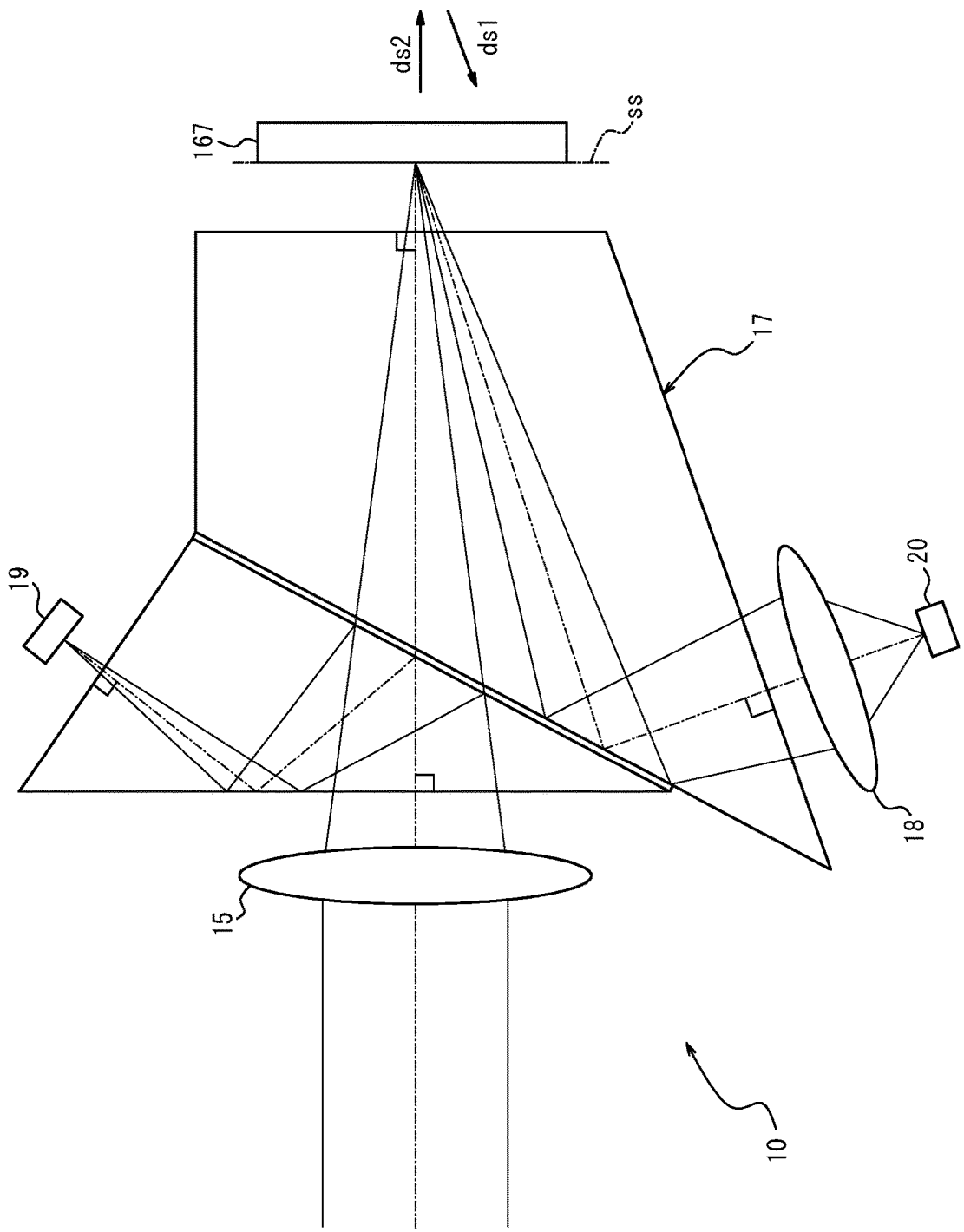
FIG. 15 is a schematic configuration diagram illustrating an example variation of the electromagnetic wave detection apparatus according to the first embodiment.

For example, the second state may refer a transmitting state in which electromagnetic waves incident on the reference surface ss are caused to pass and propagate in the first direction d2, as illustrated in FIG. 15. In particular, the first propagation unit 167 may include a shutter that is provided for each of the pixels px and includes a reflection surface for reflecting electromagnetic waves in the first selection direction ds1. The first propagation unit 167 including this configuration can switch between the reflection state serving as the first state and the transmission state serving as the second state, by opening or closing the shutter for each of the pixels px.

The first propagation unit 167 including the above configuration may be, for example, a propagation unit that includes a MEMS shutter in which a plurality of shutters capable of opening and closing are arranged in an array. The first propagation unit 167 including the above configuration may be, for example, a propagation unit that includes a liquid crystal shutter that can be switched between the reflection state for reflecting electromagnetic waves and the transmission state for transmitting electromagnetic waves, in accordance with a liquid crystal alignment. The first propagation unit 167 including this configuration can switch between the reflection state serving as the first state and the transmission state serving as the second state for each of the pixels px by switching the liquid crystal alignment for each of the pixels px.

In the first to eighth embodiments, the information acquisition system 11 includes the configuration in which the scanner 13 scans a beam of an electromagnetic wave emitted from the radiation unit 12, and the second detector 20 functions as a scanning type active sensor in cooperation with the scanner 13. However, the information acquisition system 11 is not limited to this configuration. An effect similar to the first to eighth embodiments can be obtained by, for example, a configuration in which the radiation unit 12 including a plurality of radiation sources capable of radiating radial electromagnetic waves performs a phased-scanning method for radiating electromagnetic waves from each of the radiation sources at phased radiation timings. An effect similar to the first to eighth embodiments can be obtained by, for example, a configuration in which the information acquisition system 11 does not include the scanner 13, the radiation unit 12 emits radial electromagnetic waves, and information is acquired without scanning.

In the first to eighth embodiments, the information acquisition system 11 includes the configuration in which the first detector 19 serves as a passive sensor and the second detector 20 serves as an active sensor. However, the information acquisition system 11 is not limited to this configuration. An effect similar to the first to eighth embodiments can be obtained by, for example, a configuration in which both the first detector 19 and the second detector 20 serve as active sensors or passive sensors. In a case in which both the first detector 19 and the second detector 20 serve as active sensors, either the radiation unit 12 or respective radiation units 12 may emit electromagnetic waves to the object ob. Further, the respective radiation units 12 may emit electromagnetic waves of the same type or different types.

Note that a system as disclosed herein includes various modules and/or units configured to perform a specific function, and these modules and units are schematically illustrated to briefly explain their functionalities and do not specify particular hardware and/or software. In that sense, these modules, units, and other components simply need to be hardware and/or software configured to substantially perform the specific functions described herein. Various functions of different components may be realized by any combination or subdivision of hardware and/or software, and each of the various functions may be used separately or in any combination. Further, an input/output device, an I/O device, or user interface configured as, and not limited to, a keyboard, a display, a touch screen, and a pointing device may be connected to the system directly or via an intermediate 110 controller. Thus, various aspects of the present disclosure may be realized in many different embodiments, all of which are included within the scope of the present disclosure.

REFERENCE SIGNS LIST 10, 100, 101, 102, 103, 104, 105, 106 electromagnetic wave detection apparatus
11 information acquisition system
12 radiation unit
13 scanner
14 controller
15 first imaging unit
16, 167 first propagation unit
17, 170, 171, 172, 173, 174, 175, 176 second propagation unit
18 second imaging unit
19 first detector
20 second detector
21 first prism
22, 220, 221, 223, 224, 225, 226 second prism
23, 230, 231 first intermediate layer
240, 242 second intermediate layer
250 spacer
261, 262, 263, 264, 265, 266 third prism
d1, d2, d3, d4, d5, d6, d7 first direction, second direction, third direction, fourth direction, fifth direction, sixth direction, seventh direction
ds1, ds2 first selection direction, second selection direction
ob object
px pixel
s1, s2, s3, s4, s6 first surface, second surface, third surface, fourth surface, sixth surface
s5, s50, s51, s53, s54, s55, s56 fifth surface
ss reference surface

The invention claimed is:

1. An electromagnetic wave detection apparatus comprising:
a first propagation unit comprising a plurality of pixels along a reference surface and configured to propagate electromagnetic waves incident on the reference surface in a particular direction at each of the pixels;
a second propagation unit including a first surface configured to propagate electromagnetic waves incident from a first direction in a second direction and propagate electromagnetic waves propagated in a third direction in a fourth direction, a second surface configured to separate electromagnetic waves propagated in the second direction and propagate the electromagnetic waves in the third direction and a fifth direction, a third surface configured to emit electromagnetic waves propagated in the fourth direction, a fourth surface configured to emit electromagnetic waves propagated in the fifth direction towards the reference surface and to propagate electromagnetic waves incident again from the reference surface in a sixth direction, a fifth surface configured to propagate electromagnetic waves propagated in the sixth direction in a seventh direction, and a sixth surface configured to emit electromagnetic waves propagated in the seventh direction;
a first detector configured to detect electromagnetic waves emitted from the third surface; and
a second detector configured to detect electromagnetic waves emitted from the sixth surface.

2. The electromagnetic wave detection apparatus according to claim 1,
further comprising a first imaging unit configured to form an image from the electromagnetic waves incident from the first direction and propagate the image towards the first surface.

3. The electromagnetic wave detection apparatus according to claim 2,
wherein the first imaging unit is configured to form the image on a detection surface of a first detector via the second surface.

4. The electromagnetic wave detection apparatus according to claim 1,
further comprising a second imaging unit configured to form an image from the electromagnetic waves emitted from the sixth surface and propagate the image towards the second detector.

5. The electromagnetic wave detection apparatus according to claim 1,
wherein the first surface is configured to transmit or refract the electromagnetic waves incident from the first direction and propagate the electromagnetic waves in the second direction.

6. The electromagnetic wave detection apparatus according to claim 1,
wherein a first surface is configured to subject the electromagnetic waves propagated in the third direction to internal reflection and propagate the electromagnetic waves in the fourth direction.

7. The electromagnetic wave detection apparatus according to claim 1,
wherein among the electromagnetic waves propagated in the second direction, the second surface is configured to propagate electromagnetic waves of a particular wavelength in the third direction and to propagate electromagnetic waves of other wavelengths in the fifth direction.

8. The electromagnetic wave detection apparatus according to claim 1,
wherein a fourth surface is configured to transmit or refract the electromagnetic waves incident again from the reference surface in the sixth direction.

9. The electromagnetic wave detection apparatus according to claim 1,
wherein a fifth surface is configured to subject the electromagnetic waves propagated in the sixth direction to internal reflection and propagate the electromagnetic waves in the seventh direction.

10. The electromagnetic wave detection apparatus according to claim 1,
wherein the second propagation unit comprises a first prism, a second prism, and a first intermediate layer,
the first intermediate layer is disposed between the first prism and the second prism and comprises the second surface along an interface with the first prism,
a first surface comprises a surface on the first prism,
a third surface comprises a different surface than the surface on the first prism,
a fourth surface comprises a surface on the second prism,
a fifth surface comprises an interface between the first intermediate layer and the second prism, and
a sixth surface comprises a different surface than the surface on the second prism.

11. The electromagnetic wave detection apparatus according to claim 1,
wherein the second propagation unit comprises a first prism, a second prism, a third prism, and a first intermediate layer,
the first intermediate layer is disposed between the first prism and the third prism and comprises the second surface along an interface with the first prism,
the third prism is disposed between the first intermediate layer and the second prism,
the first surface comprises a surface on the first prism,
the third surface comprises a different surface than the surface on the first prism,
the fourth surface comprises a surface on the second prism,
the fifth comprises an interface between the second prism and the third prism, and
the sixth surface comprises a different surface than the surface on the second prism.

12. The electromagnetic wave detection apparatus according to claim 1,
wherein the second propagation unit comprises a first prism, a second prism, a first intermediate layer, and a second intermediate layer,
the first intermediate layer is disposed between the first prism and the second intermediate layer and comprises the second surface along an interface with the first prism,
the second intermediate layer is disposed between the first intermediate layer and the second prism,
the first surface comprises a surface on the first prism,
the third surface comprises a different surface than the surface on the first prism,
the fourth surface comprises a surface on the second prism,
the fifth surface comprises an interface between the second intermediate layer and the second prism, and
the sixth surface comprises a different surface than the surface on the second prism.

13. The electromagnetic wave detection apparatus according to claim 1,
wherein the first propagation unit is configured to switch each pixel between a first reflection state of reflecting electromagnetic waves incident on the reference surface in a first direction and a second reflection state of reflecting the electromagnetic waves in a direction different than the first direction.

14. The electromagnetic wave detection apparatus according to claim 1,
further comprising a scanner configured to scan using electromagnetic waves emitted from a radiation unit,
wherein each of a first detector and a second detector comprises an active sensor configured to detect reflected waves of electromagnetic waves radiated to an object by a radiation unit from the object or a passive sensor.

15. The electromagnetic wave detection apparatus according to claim 1,
further comprising a controller configured to acquire information related to surroundings based on electromagnetic waves detection result from the first detector and the second detector.

\* \* \* \* \*